US010341853B2

(12) United States Patent
Edge

(10) Patent No.: US 10,341,853 B2
(45) Date of Patent: Jul. 2, 2019

(54) METHODS AND SYSTEMS FOR ENABLING CONTROL OF PRIVACY FOR CROWDSOURCING

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 14/822,745

(22) Filed: Aug. 10, 2015

(65) Prior Publication Data
US 2016/0044504 A1 Feb. 11, 2016

Related U.S. Application Data

(60) Provisional application No. 62/035,996, filed on Aug. 11, 2014.

(51) Int. Cl.
H04W 12/02 (2009.01)
H04W 4/02 (2018.01)
(Continued)

(52) U.S. Cl.
CPC ........... H04W 12/02 (2013.01); G01S 5/0252 (2013.01); H04W 4/02 (2013.01);
(Continued)

(58) Field of Classification Search
CPC ....... H04W 4/02; H04W 64/00; H04W 4/025; H04W 12/08; H04W 4/206; H04M 3/42365
(Continued)

(56) References Cited

U.S. PATENT DOCUMENTS 9,572,026 B2* 2/2017 Hart .................. H04W 12/02
2011/0081918 A1 4/2011 Burdo et al.
(Continued)

FOREIGN PATENT DOCUMENTS

WO WO-2014026338 A1 2/2014

OTHER PUBLICATIONS

Gorlatova M. et al., "Managing base station location privacy", Military Communications Conference, 2011—MILCOM 2011, IEEE, Nov. 7, 2011 (Nov. 7, 2011), pp. 1201-1206, XP032092731, DOI: 10.1109/MILCOM.2011 .6127464 ISBN: 978-1-4673-0079-7, p. 1201, left-hand column, lines 7-16, 33-44, p. 1203, left-hand column, line 10-line 21.
(Continued)

Primary Examiner — Jaime M Holliday
(74) Attorney, Agent, or Firm — Thien T. Nguyen

(57) ABSTRACT

Example methods, apparatuses, or articles of manufacture are disclosed herein that may be utilized, in whole or in part, to facilitate or support one or more operations or techniques for enabling control of privacy for crowdsourcing, such as for use in or with a mobile communication device within an indoor or like environment. In certain embodiments, control of privacy may be enabled by designating by a server certain sources of crowdsourcing such as WiFi or Bluetooth® APs as being tentative. A mobile device that encounters a source designated as tentative may query a server for information concerning permitted and/or not permitted types of crowdsourcing for the source. The server may return an indication of the permitted level of crowdsourcing for the source which the mobile device may then use to perform, or refrain from performing, crowdsourcing.

45 Claims, 6 Drawing Sheets

(51) Int. Cl.
*G01S 5/02* (2010.01)
*H04M 3/42* (2006.01)
*H04W 64/00* (2009.01)
*H04W 12/08* (2009.01)

(52) U.S. Cl.
CPC ........ *H04M 3/42365* (2013.01); *H04W 4/025* (2013.01); *H04W 12/08* (2013.01); *H04W 64/00* (2013.01)

(58) Field of Classification Search
USPC .................... 455/414.1, 414.2, 456.1, 456.2
See application file for complete search history.

(56) References Cited

U.S. PATENT DOCUMENTS

| | | | | |
|---|---|---|---|---|
| 2012/0202517 | A1* | 8/2012 | Edge | ..................... H04W 4/023 455/456.1 |
| 2012/0246718 | A1 | 9/2012 | Spears et al. | |
| 2014/0066018 | A1 | 3/2014 | Zhu | |
| 2014/0067938 | A1 | 3/2014 | Boldyrev et al. | |
| 2014/0095460 | A1 | 4/2014 | Romanowski | |

OTHER PUBLICATIONS

"Internal Location Protocol—Approved Version 2.0.2", Jul. 8, 2014, (Jul. 8, 2014), XP055224001, Retrieved from the Internet: URL:http://technical.openmobilealliance.org/Technical/ Release_Program/docs/SU PUV2_0_2-20140721 /OMA-TS-ILPV2_0_2-20140708-A.pdf [retrieved on Oct. 28, 2015].

International Search Report and Written Opinion—PCT/US2015/044534—ISA/EPO—dated Nov. 5, 2015.

International Search Report and Written Opinion—PCT/US2018/030747—ISA/EPO—dated Jul. 24, 2018.

* cited by examiner

METHODS AND SYSTEMS FOR ENABLING CONTROL OF PRIVACY FOR CROWDSOURCING

CROSS-REFERENCE TO RELATED APPLICATIONS

This application claims the benefit of and priority to U.S. Provisional Patent Application Ser. No. 62/035,996, entitled "Method and/or System for Enabling Privacy for Crowdsourcing," filed on Aug. 11, 2014, which is assigned to the assignee hereof and which is expressly incorporated herein by reference.

BACKGROUND

1. Field

The present disclosure relates generally to position or location estimation of mobile communication devices and, more particularly, to enabling control of privacy for crowdsourcing.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users by enabling estimation of their geographic or civic locations. For example, in an outdoor environment, certain mobile communication devices may obtain an estimate of their geographic location or so-called "position fix" by acquiring and measuring wireless signals from a satellite positioning system (SPS), such as the global positioning system (GPS) or other like Global Navigation Satellite Systems (GNSSs), or from cellular base stations belonging to a wireless communications network. For example, position methods such as Advanced Forward Link Trilateration (AFLT) and Observed Time Difference Of Arrival (OTDOA) may be used to determine the location of a mobile device from measurements of signals received from cellular base stations by the mobile device.

In an indoor environment, certain mobile communication devices may be unable to reliably receive or acquire satellite signals or signals from cellular base stations to facilitate or support accurate location of the mobile device. The position of a mobile device may then be estimated based in part on information gathered from other systems. One such system may comprise a wireless local access network (WLAN) communication system comprising a number of wireless access points, such as, for example, WiFi access points (APs), Bluetooth® beacons (also referred to herein as access points or APs), Bluetooth Low Energy (BTLE) beacons or APs, Home Base Stations or Femtocells, or the like. A position estimate for a mobile device may then be obtained using measurements made by the mobile device of Radio frequency (RF) signals transmitted by one or more access points, femtocells etc. in a WLAN including measurements of round trip signal propagation time (RTT), received signal strength indication (RTT), code phase difference, time of arrival (TOA), time difference of arrival (TDOA), or other measurements obtained through communication with the one or more wireless access points, femtocells, etc. The position estimate may be determined by applying one or more positioning techniques, such as trilateration, multilateration, RF pattern matching, etc. to the measurements obtained by the mobile device.

The determination of a position estimate may be assisted by information for measured APs and home base stations, such as their locations, transmission power, transmission timing, RF signal power receivable at different locations, or the like. In some cases, some or all of the information for the measured APs and femtocells may be obtained at a previous time or at previous times from a large number of mobile devices that crowdsource measurements and/or other information for visible APs and home base stations to one or more central servers. However, the mobile devices that perform the crowdsourcing may need to support privacy in the case of some APs and home base stations and either not crowdsource any information or crowdsource only selected information (e.g. the identity and approximate location of an AP but not its transmission characteristics). The support of privacy may in some cases have regulatory or other legal backing and/or may be supported voluntarily by some vendors and/or operators for mobile devices. Other types of crowdsourcing (e.g. based on collecting visual information via photos or acoustical information via sound clips) may be subject to similar types of privacy requirements. However, it may not be clear to a mobile device that is capable of performing crowdsourcing what privacy requirements may need to be observed for particular APs and home base stations—for example, for which APs and home base stations the mobile device should refrain from performing crowdsourcing. There may thus be a benefit in enabling the support and control of privacy when performing crowdsourcing from mobile devices.

BRIEF DESCRIPTION OF THE DRAWINGS

Non-limiting and non-exhaustive aspects are described with reference to the following figures, wherein like reference numerals refer to like elements, like components or like parts throughout the various figures and description below unless otherwise specified.

SUMMARY

Figure 1:
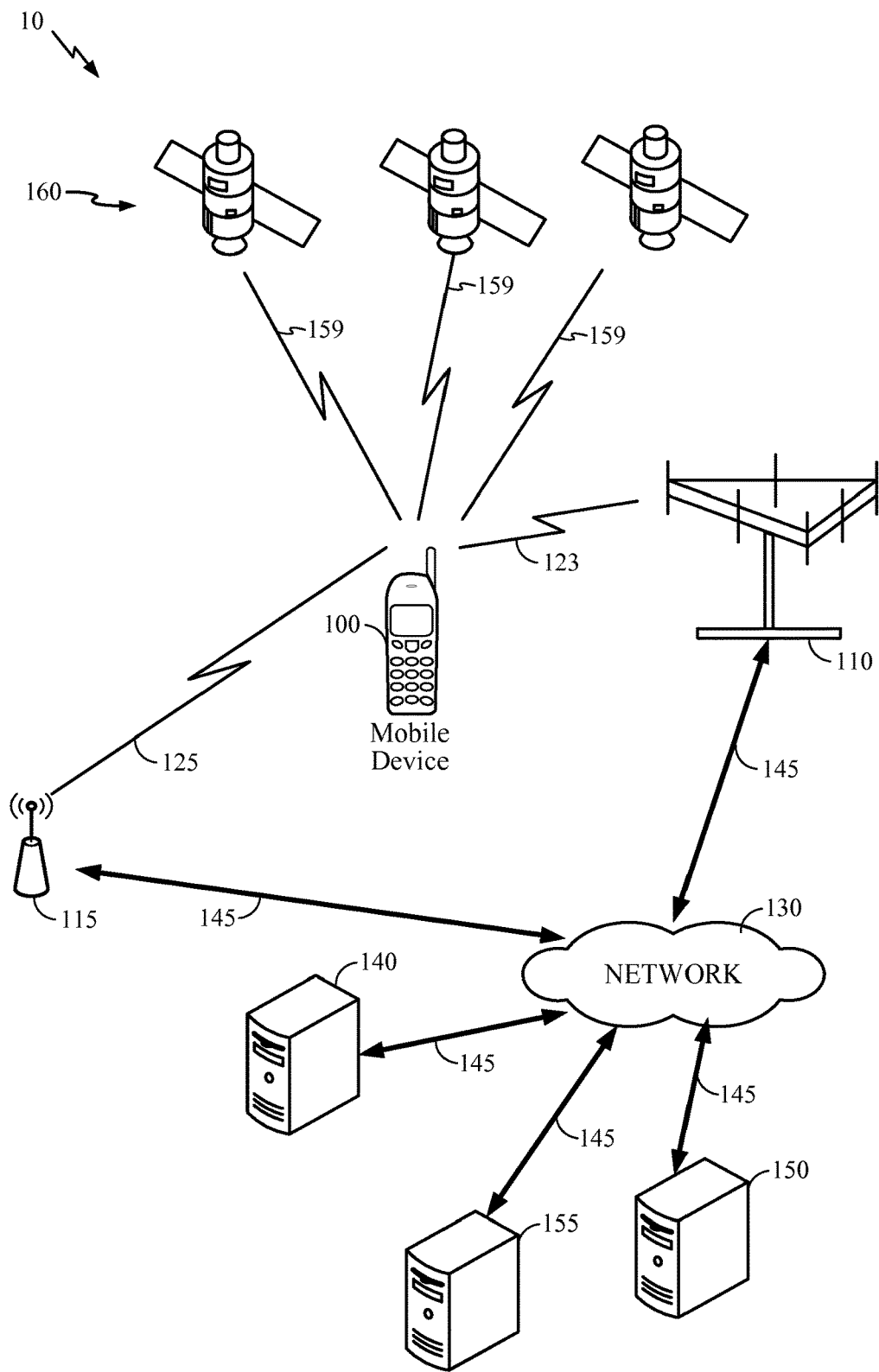
FIG. 1 is a schematic diagram illustrating features associated with an implementation of an example operating environment.

Example implementations relate to techniques for enabling control of privacy for crowdsourcing. In one implementation, a method may comprise receiving, at a server device, a first message from a mobile device identifying at least one source as a candidate for obtaining a crowdsourcing observation; determining a level of observation permitted for the at least one source; and transmitting a second message to the mobile device indicating the permitted level.

In another implementation, an apparatus may comprise means for receiving a first message from a mobile device identifying at least one source as a candidate for obtaining a crowdsourcing observation; means for determining a level of observation permitted for the at least one source; and means for transmitting a second message to the mobile device indicating the permitted level.

In yet another implementation, an apparatus may comprise a wireless transceiver to communicate with an electronic communications network; and one or more processors coupled to a memory and configured to receive a first message from a mobile device identifying at least one source as a candidate for obtaining a crowdsourcing observation; determine a level of observation permitted for the at least one source; and transmit a second message to the mobile device indicating the permitted level.

In yet another implementation, an article may comprise a non-transitory storage medium having instructions executable by a processor to receive a first message from a mobile device identifying at least one source as a candidate for obtaining a crowdsourcing observation; determine a level of observation permitted for the at least one source; and transmit a second message to the mobile device indicating the permitted level.

In yet another implementation, a method may comprise transmitting, at a mobile device, a first message identifying at least one source as a candidate for obtaining a crowdsourcing observation; and receiving a second message indicating a level of the crowdsourcing observation permitted for the at least one source.

In yet another implementation, an apparatus may comprise means for transmitting a first message identifying at least one source as a candidate for obtaining a crowdsourcing observation; and means for receiving a second message indicating a level of the crowdsourcing observation permitted for the at least one source.

In yet another implementation, a mobile device may comprise a wireless transceiver to communicate with an electronic communications network; and one or more processors coupled to a memory and configured to transmit a first message identifying at least one source as a candidate for obtaining a crowdsourcing observation; and receive a second message indicating a level of the crowdsourcing observation permitted for the at least one source.

In yet another implementation, an article may comprise a non-transitory storage medium having instructions executable by a processor to transmit, at a mobile device, a first message identifying at least one source as a candidate for obtaining a crowdsourcing observation; and receive a second message indicating a level of the crowdsourcing observation permitted for the at least one source. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, and/or articles of manufacture are disclosed herein that may be implemented, in whole or in part, to facilitate or support one or more operations or techniques for enabling control of privacy for crowdsourcing. In this context, "crowdsourcing" or like terms may refer to a process of observing, measuring, collecting, generating, communicating, etc. signal-related measurements or other information related to communications entities such as access points (APs) and home base stations by one or more agents, clients, or users, such as via nearby mobile communication devices, for example, while traveling and/or being located within an area of interest. The terms "agent," "user," or "client" may be used interchangeably herein and may refer to a person, device, or application that may facilitate or support one or more crowdsourcing operations or techniques. In some instances, crowdsourced data may include, for example, measurements of wireless transmissions of one or more access points, home base stations, femtocells, etc. indicative of timing and/or signaling characteristics of detected wireless signals, such as received signal strength indication (RSSI) related measurements, round-trip signal propagation time (RTT) related measurements, signal to noise ratio (S/N) related measurements, angle of departure (AOD) related measurements, angle of arrival (AOA) related measurements, time of arrival (TOA) related measurements, and Observed Time Difference of Arrival (OTDOA) related measurements (e.g. such as a reference signal time difference (RSTD) measurement).

Crowdsourced data may also include information that can be detected or otherwise obtained without performing measurements such as the identity or address (e.g. a 48 bit Media Access Control (MAC) address in the case of a Bluetooth or WiFi AP or a cell global identity in the case of a femtocell or home base station) or the location coordinates or civic location of an AP or femtocell when broadcast or otherwise transmitted by the AP or femtocell. Crowdsourced data may further include information that can be determined by either a mobile device from measurements of signals received from APs and femtocells or by a server to which such measurements are crowdsourced by a mobile device. Such determined information may include the locations of APs and femtocells, transmission characteristics such as transmission power and transmission timing, the radio coverage areas of APs and femtocells and radio heatmaps that provide a measured or expected signal characteristic (e.g. for RSSI, RTT or S/N) for a particular AP or femtocell at a number of different locations such as at each point in a grid of points spaced at one meter intervals within a coverage area of the AP or femtocell. As discussed below, at times, crowdsourced measurements and other crowdsourced information may, for example, be processed in some manner (e.g., at a server, etc.) and may be provided as part of positioning assistance data to mobile device to assist the mobile devices to determine their locations and/or may be retained by a server to assist the server to determine locations for a number of mobile devices.

A mobile device may be referred to as a mobile communication device, crowdsourcing device, location-aware mobile device, user equipment (UE), mobile station (MS), wireless terminal, terminal, mobile terminal or by some other name and may refer to any kind of special purpose computing device and/or apparatus that supports wireless and/or wireline communication and is potentially able to change location. In some instances, a mobile device may, for example, be capable of communicating with other devices, mobile or otherwise, through wireless transmission and/or receipt of information according to one or more communication protocols. As a way of illustration, mobile devices, may include, for example, cellular phones, smartphones, personal digital assistants (PDAs), laptop computers, personal entertainment systems, tablet personal computers (PCs), personal audio or video devices, personal navigation devices, smart watches, radio heatmap generation tools, or the like. It should be appreciated, however, that these are merely examples of mobile devices that may be used, at least in part, to implement one or more operations or techniques for enabling control of privacy for crowdsourcing, and that claimed subject matter is not limited in this regard.

The terms "position", "position fix", "position estimate", "location", "location fix", "location estimate" may be used interchangeably herein. A location may refer to a geographic location which designates via geographic means a point, area or volume somewhere on or near to the surface of the Earth (e.g. may comprise a latitude, longitude and possibly an altitude). A location may also or instead refer to a civic location which may comprise a street address, postal address, a designation of a building or part of a building (e.g. a room, suite or apartment in a building), a part of a town or city, or some other information also indicating a point, area or volume on or near to the surface of the Earth.

The terms femtocell, small cell and home base station are used interchangeably herein to refer to a cellular base station with limited RF coverage (e.g. 50 to 200 meters) that either supports many or all wireless users for a particular network or supports just one or a few users (e.g. such as users associated with a particular office, house or apartment). Examples of a small cell, femtocell and home base station may include a Home eNode B that supports LTE and a Home Node B that supports WCDMA.

As alluded to previously, in an indoor environment or like partially or substantially enclosed area (e.g., an urban canyon), certain mobile devices may be unable to reliably receive or acquire sufficient satellite signals and/or signals from cellular base stations to facilitate or support one or more position estimation techniques. For example, signals from a Satellite Positioning System (SPS) such as GPS, Glonass or Galileo or signals from cellular base stations may be attenuated or subject to multipath effects sufficiently to prevent or degrade accurate positioning related measurements by a mobile device. In such cases, a mobile device may obtain a position fix using positioning methods adapted to indoor or partially enclosed environments. Examples of such position methods may include measuring ranges to three or more short range wireless transmitters (e.g., WiFi access points, home base stations, femtocells, etc.) positioned at known locations. Ranges may be obtained by measuring one or more characteristics of received signals, such as RSSI, RTT or S/N. Alternatively or in addition, angles to or from the wireless transmitters may be measured (e.g. AOA or AOD). The identities of the measured transmitters may also be obtained (e.g. from signals received from the transmitters) which may comprise a Media Access Control (MAC) address in the case of WiFi or Bluetooth APs or a cell global identity (also referred to as a global cell identity or global cell ID) in the case of a femtocell or home base station. The identities of the measured transmitters may be used (e.g. by a mobile device or by a server) to look up (e.g. in preconfigured data) the locations of the measured transmitters after which techniques such as multilateration, trilateration or triangulation may be used to determine the location of the mobile device using the determined ranges and/or angles and the locations of the wireless transmitters.

As was also indicated, at times, an indoor navigation system (e.g. a location server) may selectively provide positioning assistance data to mobile devices to facilitate or support location determination services. Such positioning assistance data may include, for example, information to facilitate measurements of signals from wireless transmitters (e.g., access points, etc.) by providing, for example, the identifications of wireless transmitters nearby to a mobile device and information about the wireless technology or technologies that each wireless transmitter supports and its transmission characteristics such as its transmission power and transmission timing. In some instances, positioning assistance data may also or instead include information, such as the known locations of wireless transmitters and/or the coverage areas of wireless transmitters, to enable a mobile device to determine its location from measurements of signals from the wireless transmitters. In addition or instead, assistance data may include radio heatmap or "fingerprint" data for a wireless transmitter indicating the expected value or values of one or more signal characteristics (e.g. RSSI, RTT or S/N) for the wireless transmitter at different known locations, such as at each grid point in a set of grid points spaced at known distances from one another (e.g. at one meter intervals) which may assist a mobile device in associating signal measurements for different wireless transmitters with a particular location via use of RF pattern matching techniques.

In some instances, positioning assistance data may include an electronic digital map for an indoor or like environment. An electronic digital map may, for example, be provided by a suitable server to a mobile device when the mobile device enters a particular indoor or like area (e.g., a shopping mall, etc.), upon request by the mobile device or a user of the mobile device, or to support a particular service or application running on the mobile device. An electronic digital map may include, for example, a floor plan or layout comprising indoor features of a building, venue or an area within a venue or building, such as doors, hallways, staircases, elevators, walls, etc., as well as points of interest (POIs), such as restrooms, stores, rooms, entry ways, pay phones, or the like. In some instances, an electronic digital map may, for example, be stored at a suitable server to be accessible or usable by a mobile device, such as via a selection or activation of a Uniform Resource Locator (URL), for example. By having a digital map of an area of interest, a mobile device may, for example, be capable of overlaying its current location over the displayed map of the area so as to provide to an associated user or an application on the mobile device some relevant context, frame of reference, or the like.

At times, an indoor navigation system may include a location server or like server capable of calculating a location of one or more mobile devices based, at least in part, on location measurements made by a mobile device and provided to the server of nearby access points, femtocells and home base stations. The measurements may include measurements of RSSI, RTT, S/N, AOA, TOA, RSTD etc., and may further include an identification or address for each access point, femtocell and home base station that was measured. As part of the location calculation, the server may make use of known locations and/or other known characteristics (e.g. transmission power, antenna gain, transmission timing etc.) for each of the access points, femtocells and home base stations that were measured. The server may then employ positioning methods involving trilateration, multilateration, triangulation etc. to determine a location for a mobile device. The server may also or instead make use of RF heat maps that provide the known or expected values of one more signaling characteristics for any access point, femtocell or home base station that was measured at a number of different known locations such as at locations spaced one meter apart within a rectangular grid of locations. In this case, the server may employ RF pattern matching to determine a most probable location for a mobile device. The information used by the server to determine the locations of mobile devices (e.g. the known locations, known signaling characteristics and/or RF heat maps) for the measured access points, femtocells and home base stations may have been provided, at least in part, via crowdsourcing of information for these same access points, femtocells and home base stations by a number (e.g. hundreds or thousands) of mobile devices at some recent time or some recent times in the past (e.g. a few weeks to a few months earlier). As described previously, crowdsourced information provided by mobile devices can be used to gather such information for access points, femtocells and home base stations and can be used later to help locate other mobile devices.

In providing crowdsourced information to a location server or other server, it may sometimes be useful or even essential to associate the crowdsourced information with the location of the mobile device that is providing the crowdsourced information at the time the crowdsourced information is measured and collected. In such a case a mobile device or a server may determine the location of the mobile device using independent positioning methods that may not be dependent, or not completely dependent, on the measurements of the access points, femtocells and home base stations that are being crowdsourced. Such independent positioning methods may include GPS, assisted GPS (A-GPS), GNSS, assisted GNSS (A-GNSS), use of inertial or other sensors located in a mobile device, measurement of base stations (e.g. measurement of RSTD values for OTDOA) whose locations are known via a site survey or some other means not dependent on crowdsourcing. The determined locations of mobile devices that provide crowdsourced measurements to a server may then be used to help infer information for the access points, femtocells and home base stations for which crowdsourced measurements are provided. For example, when crowdsourced measurements from a large number (e.g. hundreds or thousands) of mobile devices of signal characteristics such as RSSI, RTT, S/N, AOA, TOA, RSTD are available for a particular access point, femtocell or home base station and/or for a number of nearby access points, femtocells and home base stations, a server may employ reverse positioning techniques to obtain a probable location or probable location area (e.g. such a circle with a radius of 50 meters or less) for each access point, femtocell or home base station based on the known locations of the mobile devices that provided the crowdsourced measurements. Similarly, the server may infer other characteristics for the access points, femtocells and home base stations such as transmission power and transmission timing from the crowdsourced measurements and may determine an RF heat map using particular measurements (e.g. RSSI or RTT) for a particular access point, femtocell or home base station that were made by mobile devices at different known locations within the coverage area of the access point, femtocell or home base station. In some cases, a server may employ interpolation and extrapolation techniques to predict a signal characteristic for an AP or femtocell at locations (e.g. within a rectangular grid of locations) from which no (or few) mobile devices had provided crowdsourcing measurements for the AP or femtocell.

As was indicated, the resulting RF heatmaps, locations, and/or other signal and transmission characteristics obtained or calculated by a server for a number of access points, femtocells and home base stations may subsequently be used by a location server to calculate locations of mobile devices, and/or may be provided as positioning assistance data to mobile devices to assist the mobile devices in determining their own locations based, at least in part, on measurements of access points and/or femtocells. It should be appreciated that, depending on an implementation, computing positioning assistance data, estimating locations of wireless transmitters, or like processing may be performed, at least in part, on a mobile device, location server or other server, or any combination thereof.

As discussed herein crowdsourcing may involve gathering suitable data about wireless networks by mobile devices and/or sending the data to a server (e.g. a location server, etc.) where the crowdsourced data from many devices can be combined and/or later used to assist the server in determining the locations of mobile devices and/or sent to mobile devices as assistance for positioning. Crowdsourced data may typically include the addresses and/or identities (e.g. MAC address or cell global identity) of wireless cells, base stations, femtocells, WiFi APs, Bluetooth APs and measurements of their signal transmissions such as RSSI, RTT, S/N, AOA, TOA, RSTD or the like. As was also indicated, crowdsourced data may include information that some users, network operators, network managers, network owners etc. may prefer not to be collected, shared, etc. for reasons of privacy, data confidentiality, or the like. For example, some users, network operators, etc. may prefer that mobile devices refrain from crowdsourcing addresses and/or identities of wireless cells, base stations, femtocells, WiFi access points, Bluetooth access points and/or certain or all measurements of signal transmissions, such as RSSI, RTT, S/N or the like.

Recently, a convention was created by Google to allow a private (non-commercial) owner of a WiFi AP to indicate that data for the AP should not be crowdsourced by including a "nomap" indication at the end of the service set identifier (SSID) broadcast by the AP. Other proposals to restrict crowdsourcing would have a WiFi AP include a flag or value in beacon transmissions from the AP. These solutions may be limited in several respects. As one example, some solutions may require active support by APs and may thus not be applicable to legacy APs. As another example, some solutions may require configuration of APs by users which may be both an inconvenience to users and unreliable if an AP loses power for some period and is then reset to a state prior to the configuration change by the user. As yet another example, some solutions may require active support from crowdsourcing devices such a mobile devices, such as recognition of a particular flag or value in the beacon frame transmitted from an AP, which may not be not be implemented by devices that were designed prior to the definition of and agreement on the active support.

According to an embodiment, decisions on performing crowdsourcing at a mobile device may be determined at a server. For example, a server may configure and/or instigate preferred crowdsourcing observations by a mobile device including configuring and/or instigating the types of observations to be obtained and/or not obtained by the mobile device, the periodicity of obtaining such observations, the reporting intervals etc. The server may configure and/or instigate the preferred crowdsourcing observations by sending the preferences to one or more mobile devices for usage over some predetermined or provided time period (e.g., one week to one year). This may allow the server to control how crowdsourcing is performed by one or more mobile devices. For example, the server may control for which APs, femtocells and home base stations a mobile device will and will not obtain crowdsourcing measurements and, for APs, femtocells and home base stations for which crowdsourcing measurements are permitted, the server may further control which particular measurements are permitted (e.g. which of RSSI, RTT, S/N, AOA etc. a mobile device is allowed to measure and report).

In order to increase the level of control over crowdsourcing, a server may further designate certain (or all) sources for crowdsourcing initially as being "tentative." In this context, a "source" for crowdsourcing observations may correspond to any WiFi AP, any Bluetooth AP, any femtocell or home base station, any base station or may correspond to particular types, particular instances or particular groups of WiFi APs, Bluetooth APs, femtocells, home base stations or base stations. A server may specify a particular source of crowdsourcing for which crowdsourcing is designated as tentative by providing, to mobile devices whose crowdsourcing is being controlled, one or more attributes for the particular source. Examples of such attributes may include a particular type of AP and/or femtocell such as: (i) any WiFi AP; (ii) any Bluetooth AP; (iii) any LTE femtocell; (iv) any IEEE 802.11x WiFi AP (e.g. where the 802.11x indicates a particular 802.11 type such as 802.11b or 802.11g); or (v) any BTLE AP. Other examples of such attributes for a particular source designated as tentative may include: (i) a particular environment or environments (e.g., indoors or outdoors) within which the source is located; (ii) one or more particular geographic areas and/or venues within which the source is located; (iii) certain types of WiFi SSIDs for a source (e.g., an SSID containing a "_nomap" indication); (iv) sources that correspond to particular network types (e.g. LTE or IEEE 802.11); (v) sources that belong to or are associated with one or more particular networks or network operators; or (vi) sources that are located within a particular country, state, city or town.

According to an embodiment, if a mobile device encounters any sources designated by a server as being tentative, the mobile device may query the server before attempting to obtain a crowdsourcing observation for that source. In one implementation, the mobile device may attempt to obtain crowdsourcing observations for a source irrespective of whether the source is classified as tentative or permissible, etc. Then, only observations from sources deemed "permissible" by a server may be reported to the server for crowdsourcing.

According to an embodiment, in response to receiving a message from a mobile device inquiring about permission to obtain an observation from a source designated as tentative by the server, a server may query a database (e.g. a national register, or a database local to a particular area, venue, organization etc., that comprises AP MAC addresses, femtocell global cell IDs, network IDs and/or venue SSIDs), to determine whether obtaining an observation of a source for crowdsourcing is allowed. The server may further determine (e.g. from any suitable database being queried) the types of observation(s) that may be permitted and/or the time period over which such observations are permitted. The server may then provide a response message to the requesting mobile device indicating a level of permitted crowdsourcing (e.g., nothing, everything or certain specific measurements such RSSI and RTT but not, for example, S/N or AOA). Optionally, the server may further specify a geographic area and/or duration for which any permission or restrictions on observations are to apply. The mobile device may then perform any crowdsourcing allowed by the server in a response to a query for a source or sources designated as tentative. For example, the mobile device may measure RSSI and RTT if allowed by the server for particular APs or particular types of APs, and may further perform such crowdsourcing for a permitted duration and/or within a permitted geographic area if provided by the server. Information concerning allowed and restricted observations received from the server may also be cached in memory of mobile devices (e.g. for some limited time) to enable a mobile device to correctly perform crowdsourcing whenever the same tentative source conditions are encountered at a later time.

By initially indicating certain sources and/or certain types of sources as being tentative, a server may be able to provide mobile devices with the latest privacy requirements which may avoid errors in comparison to methods that preconfigure information about permitted crowdsourcing in mobile devices in advance. Further, by allowing mobile devices to query a server about tentative sources that are detected by a mobile device and to receive instructions from the server concerning which crowdsourcing observations are permitted, a server may avoid the need to update mobile devices with privacy requirements for sources that are not encountered by the mobile devices, thereby reducing signaling usage and memory usage in mobile devices to store the privacy requirements. In addition, the instructions provided by a server to a mobile device that encounters and queries for a source designated as being tentative can be adapted to new requirements for privacy (e.g. new laws or regulations on privacy or new requirements from consumer or industry groups) without the need to program the new requirements into mobile devices in advance, which may enable legacy mobile devices as well as new mobile devices to support the new requirements.

In another implementation, in providing a message to a server inquiring about a source designated as tentative, a mobile device may provide limited information relevant to the source or sources designated as tentative, such as the identities of the sources, the identities of transmitters nearby to the sources (e.g. such as a MAC address, SSID, cell ID and/or network ID) and/or the current location of the mobile device and/or the location of the source or sources to assist the server in determining a level of permitted observation for crowdsourcing. Alternatively, the server may request specific data (e.g. as allowed by potential crowdsourcing restrictions) from the mobile device before making a determination as to a level of permitted observation for crowdsourcing.

Communication between a mobile device and a server may be needed to enable (i) a mobile device to query the server regarding permitted crowdsourcing for sources designated as tentative, (ii) the server to provide information to the mobile device on permitted crowdsourcing for these sources and/or (iii) the server to query the mobile device for more information to assist the server's determination of permitted crowdsourcing. This communication may employ a number of different communication and positioning protocols such as the Transmission Control Protocol and Internet Protocol (TCP/IP), the Secure User Plane Location (SUPL) user plane location protocol (ULP), the LTE Positioning Protocol (LPP) and/or the LPP Extensions (LPPe) protocol. SUPL, ULP and LPPe are defined by an organization known as the Open Mobile Alliance (OMA) in publicly available documents. LPP is defined by an organization known as the $3^{rd}$ Generation partnership Project (3GPP) in publicly available documents. TCP and IP are defined by the Internet Engineering Task Force (IETF).

The use of a query and response technique for crowdsourcing sources designated as tentative as described above may help to avoid the need for mobile devices to support different specific types of privacy procedures related to AP and/or femtocell transmissions and/or relieves mobile devices from responsibility for making crowdsourcing determinations which may vary between different countries, different states, and/or different owners, operators, etc. of APs and femtocells. Moreover, the discussed approach is relatively transparent and/or easily verifiable (e.g., to ensure compliance, etc.) due, at least in part, to the use of explicit communication between servers and mobile devices (e.g. which may be easy to intercept and observe) unlike an approach that might be supported inside a server where mobile devices are allowed to crowdsource all available information with filtering occurring inside the server where it might be difficult or impossible to verify.

The method may also be used to control crowdsourcing of other types of information by a mobile device. For example, the method may be used to control crowdsourcing of photos, video clips, audio clips, audio characteristics (e.g. volume and frequency range), illumination characteristics (e.g. lumination level and color range), environmental data (e.g. air pressure, air quality, temperature, humidity), data related to people (e.g. number and/or density of people visible to or hearable from a location of a mobile device) and/or data on nearby wireless networks (e.g. visible cells, RF coverage). In each case, certain sources or types of crowdsourcing may be designated as tentative by a server and/or, when encountered by a mobile device, may require the mobile device to first query the server before proceeding with any crowdsourcing if allowed by the server. The sources in this case may be identified according to type (e.g. photos, audio clips, temperature humidity) and/or may correspond to and/or be identified via particular geographic areas, venues, buildings, towns, cities, states, countries, particular environments (e.g. indoors, outdoors), particular times of day, particular days in a week or year and/or other characteristics and may or may not correspond to or be associated with wireless transmitters such as APs and femtocells.

FIG. 1 is a schematic diagram illustrating features of an example system 10 capable of facilitating or supporting one or more processes or operations for enabling privacy for crowdsourcing. It should be appreciated that a system is described herein as a non-limiting example that may be implemented, in whole or in part, in the context of various electronic communications networks or combination of such networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an outdoor environment or in a mixed environment (e.g. which may include partially or substantially enclosed areas, such as urban canyons, amphitheaters, parking garages, rooftop gardens, patios, or the like).

As illustrated, a system 10 may comprise a mobile device (MD) 100 that may receive or acquire satellite positioning system (SPS) signals 159 from SPS satellites 160. In some implementations, SPS satellites 160 may be from one global navigation satellite system (GNSS), such as the GPS or Galileo satellite systems, for example. In other implementations, the SPS Satellites 160 may be from multiple GNSS such as, but not limited to, GPS, Galileo, Glonass, or Beidou (Compass) satellite systems. In some implementations, some or all of SPS satellites 160 may be from any one or more of several regional navigation satellite systems (RNSSs), such as WAAS, EGNOS, and QZSS, just to name a few examples. As also illustrated, at times, MD 100 may transmit radio signals to, and/or receive radio signals from, a wireless communication network. In one example, MD 100 may communicate with a wireless communication network by transmitting wireless signals to, and/or receiving wireless signals from, a base station transceiver 110 over a wireless communication link 123. Similarly, MD 100 may transmit wireless signals to, and/or receive wireless signals from a local transceiver 115 over a wireless communication link 125.

In a particular implementation, local transceiver 115 may be capable of communicating with MD 100 at a shorter range (e.g. up to 200 meters) over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network, etc.), wireless personal area network (WPAN, e.g., Bluetooth® network, etc.), or the like. In another example implementation, local transceiver 115 may comprise a femtocell transceiver, home base station transceiver or small cell transceiver capable of facilitating communication via link 125 according to a cellular communication protocol (e.g. such as LTE or WCDMA). Of course, it should be understood that these are merely examples of networks that may communicate with MD 100 over a wireless link, and claimed subject matter is not limited in this respect.

It should be noted that while only one MD 100, one base station transceiver 100 and one local transceiver 115 are shown in FIG. 10, there may be others MDs, other base station transceivers and/or other local transceivers not shown in FIG. 1. The description herein may then be applicable to any of these MDs, base station transceivers and/or local transceivers of which MD 100, base station transceiver 100 and local transceiver 115 are just representative.

In a particular implementation, base station transceiver 110 and/or local transceiver 115 may communicate with servers 140, 150, and/or 155 over a network 130 through links 145. Here, network 130 may comprise any combination of wired and/or wireless links. In some instances, network 130 may comprise Internet Protocol (IP) infrastructure capable of facilitating or supporting communication between MD 100 and servers 140, 150, and/or 155 through local transceiver 115 and/or base station transceiver 110. In another implementation, network 130 may comprise cellular communication network infrastructure, such as a base station controller (BSC), mobile switching center (MSC) or mobility management entity (MME) to facilitate mobile cellular communication with MD 100. Network 130 may support such wireless technologies as Global System for Mobile Communications (GSM), Code Division Multiple Access (CDMA) 2000 (cdma2000), Wideband CDMA (WCDMA), Long Term Evolution (LTE) or High Rate Packet Data (HRPD). GSM, WCDMA and LTE are standardized by an organization known as the $3^{rd}$ Generation Partnership Project (3GPP). Cdma2000 and HRPD as standardized by an organization known as the $3^{rd}$ Generation Partnership Project 2 (3GPP2). In a particular implementation, one or more of servers 140, 150, and 155 may comprise an Enhanced Serving Mobile Location Center (E-SMLC) as defined by 3GPP or a SUPL Location Platform (SLP) as defined by the Open Mobile Alliance (OMA). A server 140, 150 or 155 that comprises an SLP may further function as a Home SLP (H-SLP) and/or as a Discovered SLP (D-SLP) according to the SUPL standards defined by OMA.

In particular implementations, MD 100 may have circuitry and/or processing resources capable of enabling or computing a position fix and/or estimating a location of MD 100. For example, MD 100 may compute or enable (e.g. in one of servers 140, 150 or 155) a position fix based, at least in part, on pseudorange measurements to four or more SPS satellites 160. Here, MD 100 may compute such pseudorange measurements based, at least in part, on pseudonoise (PN) code phase detections in signals 159 acquired from four or more SPS satellites 160, for example. In particular implementations, MD 100 may receive from server 140, 150, and/or 155 positioning assistance data to aid in the acquisition and measurement of signals 159 transmitted by SPS satellites 160 including almanac, ephemeris data, Doppler search windows, and code phase search windows just to name a few examples.

In other implementations, MD 100 may obtain or enable a position fix, at least in part, by measuring signals received from fixed terrestrial transmitters, such as base station transceiver 110 and/or local transceiver 115, using any one of several techniques, such as advanced forward trilateration (AFLT), observed time difference of arrival (OTDOA), or the like. In these particular techniques, MD 100 may measure time differences, phase differences, etc. to three or more of these terrestrial transmitters based, at least in part, on pilot or other reference signals transmitted by the transmitters and received at MD 100. Here, servers 140, 150, and/or 155 may be capable of providing positioning assistance data to MD 100 including one or more of the locations, identities, transmission timing, expected time difference measurements, etc. of terrestrial transmitters, such as base station transceiver 110 and/or local transceiver 115, to facilitate one or more positioning techniques, such as AFLT, OTDOA, or the like. For example, servers 140, 150, and/or 155 may include and send to MD 100 a base station almanac (BSA) indicating one or more of the locations, identities, transmission characteristics etc. of cellular base stations in a particular region or regions.

In some implementations MD 100 may make measurements of signals 159 from SPS satellites 160 (e.g. pseudorange measurements) and/or measurements (e.g., time difference measurements) of signals from terrestrial transmitters, such a signals over wireless communication link 123 from base station transceiver 110 or signals over wireless communication link 125 from local transceiver 115, and may receive assistance data from one of servers 140, 150 or 155 to acquire and measure these signals. However, MD 100 may not compute a location estimate for MD 100 from these measurements but may instead send the measurements to one of servers 140, 150 or 155 to compute a location for MD 100. The location computation may make use of known locations, known identities, known transmission time and/or other known characteristics for the measured transmitters. A server that computes a location for MD 100 may return the location to MD 100 and/or may retain the location—e.g. for use in determining a location for MD 100 at the time that MD 100 collected crowdsourcing measurements that were sent to the server.

As was indicated, in some environments, such as indoor environments or urban canyons, MD 100 may not be capable of reliably or accurately acquiring signals 159 from a sufficient number of SPS satellites 160 to obtain or enable a location (e.g. by one of servers 140, 150 or 155) using a GNSS based positioning method or from a sufficient number of base station transceivers and/or local transceivers to compute or enable a position fix using such methods as AFLT and OTDOA. Thus, alternatively, MD 100 may be capable of computing or enabling a position fix based, at least in part, on signals acquired from local transmitters (e.g., femtocells or WLAN access points) that are all or predominantly located in an indoor environment. For example, MD 100 may obtain or enable a position fix by measuring signals from three or more indoor terrestrial wireless access points and/or femtocells, such a local transceiver 115, such as by measuring RSSI, RTT, S/N, AOA etc. Such measurements may include obtaining a MAC address or a global (or local) cell ID from the signals received from such access points and/or femtocells. MD 100 may then compute a location estimate for MD 100 itself based at least in part on these measurements if MD 100 has assistance data (e.g., BSA sent by one of servers 140, 150 or 155 to MD 100) providing information for the measured transmitters such as their locations, identities, transmission power etc. In other implementations, MD 100 may transfer the measurements to one of servers 140, 150 or 155 which may compute a location estimate for MD 100 based on information for the measured transmitters that the server has.

In alternative implementations, MD 100 or one of servers 140, 150 or 155 may obtain a position fix for MD 100 by applying certain measurements made by MD 100 of local transmitters (e.g. measurements of RSSI or RTT, etc.) to an RF heat map that provides known or expected RSSI, RTT, or like values for a particular local transmitter at a number of known locations such as for each of set of grid points in a rectangular grid of points within or overlapping with the RF coverage area of the local transmitter. In this case, the location of the local transmitter may not need to be known by MD 100 or by one of servers 140, 150 or 155 which may obtain the location of MD 100, as least in part, by performing the technique of RF pattern matching.

As was also discussed, in particular implementations, MD 100 may receive positioning assistance data for one or more positioning operations from one or more of servers 140, 150, and/or 155. For example, positioning assistance data may include the locations and/or identities of transmitters to enable MD 100 to obtain its location based, at least in part, on measured RSSI, RTT, RSTD etc. for one or more transmitters. Other positioning assistance data for one or more transmitters to aid positioning operations (e.g. indoors) may include RF heat maps, transmission power, antenna gain, antenna down tilt, transmission timing for transmitters, routeability graphs, just to name a few examples. Other assistance data may include local maps of indoor areas for display or to aid in navigation. Such a map may be provided to MD 100 as MD 100 enters a particular indoor area. Such a map may show indoor features such as doors, hallways, entry ways, walls, etc., points of interest such as bathrooms, pay phones, room names, stores, etc. MD 100 may use such a map as an aid to navigation and/or to assist positioning—e.g. by determining likely signal propagation for indoor transmitters located in the area covered by the map based on assumed or known attenuation and reflection characteristics for intervening objects and areas such as walls, floors, doorways, rooms and corridors. MD 100 may then be able to predict expected signal characteristics (e.g. RSSI, RTT, S/N) at different locations in the map which may assist with location deamination when MD 100 measures these same characteristics for different local transmitters.

According to an implementation, MD 100 may access positioning assistance data (e.g. for indoor navigation and/or indoor positioning) through one or more of servers 140, 150, and 155 by requesting the data from one of these servers. In particular implementations, one or more of servers 140, 150, and 155 may be capable of providing assistance data for indoor use (e.g. for indoor navigation and/or indoor positioning) to cover many different indoor areas including floors of buildings, wings of hospitals, terminals at an airport, portions of a university campus, areas of a large shopping mall, just to name a few examples. In some implementations, memory resources and/or signaling resources at MD 100 may make receipt of indoor positioning assistance data for one or more areas served by servers 140, 150, and/or 155 impractical or infeasible. A request for indoor navigation and/or indoor positioning assistance data from MD 100 may then indicate a rough or course estimate of a location of MD 100. MD 100 may then be provided by servers 140, 150, and/or 155 with indoor navigation and/or indoor positioning assistance data covering areas including and/or proximate to the rough or course estimate of the location of MD 100.

In an embodiment, the assistance data that one of servers 140, 150 or 155 uses to compute a location for MD 100, and/or that one of servers 140, 150 or 155 sends to MD 100 to enable MD 100 to acquire and measure signals for local transmitters and/or to compute a location for MD 100 from these measurements, may have been obtained at least in part by the server from data crowdsourced by a number of mobile devices at some previous time or previous set of times. For example, assistance data comprising one or more of the locations, transmission characteristics, identities and/or RF heat maps for one or more base stations and/or local transmitters may be obtained by or otherwise configured in any of servers 140, 150 or 155 using data received from mobile devices (e.g. including MD 100) using crowdsourcing.

As discussed below, in a particular implementation, one or more servers 140, 150, and/or 155 may process and/or instigate preferred crowdsourcing measurements, such as measurements, observations, etc. with respect to an identity, location, particular type or types of measurement (e.g. RSSI, RTT, S/N, AOA etc.) for some or all types of WiFi access points, Bluetooth access points, LTE femtocells, etc. associated with a specific operating environment. Such an operating environment may be represented by a current location for a mobile device 100 and/or by an area in which the mobile device 100 may currently be located, was recently located or may later be located. One or more servers 140, 150, and/or 155 may indicate triggering conditions (e.g. a duration, periodic interval, visibility of some minimum number of access points, location within a particular area) that when detected by a mobile device 100 may cause the mobile device 100 to collect particular types of measurements, observations, etc. (e.g. such as measurements of RSSI, RTT and/or S/N) for certain or all types of access points (e.g. for IEEE 802.11b WiFi access points or all WiFi access points or for all WiFi and all Bluetooth access points). The mobile device 100 may then report (i.e. crowdsource) the observations and measurements back to the server when certain other triggering conditions occur (e.g. such as after a set of measurements and observations has been obtained for a current location of the mobile device 100 or at periodic intervals that may be longer than any periodic interval used for collecting the observations and measurements). Servers 140, 150, and/or 155, may also provide an overall period for performing crowdsourcing to a mobile device 100 (e.g. one week to one year, etc.) or some other trigger condition (e.g. such as being powered off) for ceasing to collect and return crowdsourcing measurements.

One or more of servers 140, 150, and/or 155 may further designate to mobile device 100 certain sources (e.g., some or all sources) for crowdsourcing as being tentative. Tentative sources may include one or more sources or particular sources, such as particular types of wireless access points (e.g., certain types of WiFi access points such as IEEE 802.11g access points, or certain types of femtocells such as femtocells that a mobile device 100 is or is not allowed to access for communications services). Tentative sources may also or instead include particular APs and/or femtocells—e.g. as indicated by particular MAC addresses, particular cell global identities or particular ranges of addresses that may correspond to particular operators, owners or managers. Tentative sources may further include APs and/or femtocells located in or otherwise associated with (i) particular environments (e.g. indoors, urban canyons, etc.), particular geographic areas and/or particular venues, (ii) certain types of WiFi SSIDs (e.g. an SSID containing a "nomap" indication, etc.), and/or (iii) particular network types, particular network identities, or the like. Of course, these are merely examples relating to tentative sources, and claimed subject matter is not so limited.

Thus, in an example implementation, if mobile device 100 encounters any source designated as tentative, mobile device 100 may query one or more of servers 140, 150, and/or 155, such as before performing crowdsourcing, for information concerning whether crowdsourcing is permitted for the tentative source, and, if so, what types of information for the tentative source are permitted to be crowdsourced. One or more servers 140, 150, and/or 155 may then query an appropriate database (e.g. via network 130) for information on permitted crowdsourcing. The database may be a national register, state register or some other register (e.g. a register owned and operated by a consumer group, industry organization or one or more network operators) that contains: (i) AP MAC addresses (e.g. for WiFi and BTLE APs); (ii) global cell IDs for femtocells, home base stations, and/or base stations; and/or (iii) network IDs and/or venue SSIDs that identify individual APs and femtocells and/or groups of APs and femtocells (such as APs and/or femtocells belonging to a particular organization, venue or network operator). The database may contain information that can determine or help determine whether crowdsourcing is allowed for a particular tentative source and which types of measurements, observations, etc. are allowed to be crowdsourced. For example, the database may contain the MAC addresses for individual WiFi APs and/or BTLE APs and/or the global cells IDs for femtocells and home base stations for which crowdsourcing is not allowed. The database may also or instead contain the MAC addresses for individual WiFi APs and/or BTLE APs and/or the global cells IDs for femtocells and home base stations for which crowdsourcing is allowed with certain restrictions such as being allowed to crowdsource the addresses of the APs and/or femtocells and home base stations, their approximate locations (e.g. with some maximum precision such as 100 meters) but not other measurements of the APs and/or femtocells and home base stations. The database may return information stored in the database relevant to the query to the server 140, 150 or 155 that sent the query.

At times, one or more of servers 140, 150, and/or 155 may make use of previously received information (e.g. as provided by a database for a query at some earlier time concerning a source that is tentative and/or as provided by owners, operators, etc. of APs, femtocells, etc.). The previously received information may indicate, similarly to a database, for which APs and/or femtocells crowdsourcing is or is not permitted, and which types of information (e.g. which particular measurements, observations, etc.) may be collected and crowdsourced for particular APs and femtocells and/or for particular categories of APs and femtocells. One or more of servers 140, 150, and/or 155 may then provide mobile device 100 with a level of permitted crowdsourcing, such as nothing, everything, particular APs and femtocells for which crowdsourcing is or is not permitted, and/or specific measurements, for example.

In some instances, one or more of servers 140, 150, and/or 155 may provide and/or indicate an applicable geographic area and/or duration of crowdsourcing to mobile device 100 for which one or more permissions and/or restrictions for crowdsourcing may apply. One or more of servers 140, 150, and/or 155 may also provide other types of permissions and/or restrictions for crowdsourcing. For example, one or more of servers 140, 150, and/or 155 may indicate an environment (e.g., indoors, outdoors, outdoor dense urban) in which crowdsourcing is permitted or not permitted, an identity of a network, network operator and/or venue for which crowdsourcing of owned or operated APs and/or femtocells is permitted or not permitted, times of day or days in the week when crowdsourcing is permitted or not permitted, or the like. In some instances, one or more of servers 140, 150, and/or 155 may query mobile device 100 for more information (e.g. concerning visible access points, visible femtocells, etc., type of environment in which mobile device 100 is located, location of mobile device 100, etc.), before sending back a level of permitted crowdsourcing to mobile device 100.

According to an implementation, mobile device 100 may perform any crowdsourcing indicated as allowed or, in some cases, not indicated as disallowed by one or more of servers 140, 150, and/or 155. In some embodiments, the allowed (or not disallowed) crowdsourcing may further be performed by mobile device 100 for a permitted duration, within a permitted geographic area, etc., if provided by one of servers 140, 150 or 155. At times, information received from one or more of servers 140, 150, and/or 155 may be cached in memory of mobile device 100 so as to enable mobile device 100 to correctly perform crowdsourcing whenever the same or similar source conditions are encountered at a later time. In some embodiments, a server 140, 150 or 155 may indicate a period of validity of crowdsourcing permission information provided to mobile device 100 to enable mobile device 100 to know for how long the information may be cached and used to determine permitted crowdsourcing by mobile device 100. In these embodiments, mobile device 100 may delete the cached information after the period of validity has expired In some instances, mobile device 100 may provide additional information related to mobile device 100 and/or to nearby wireless transmitters (e.g., such as base station transceiver 110, local transceiver 115, etc.) to one or more of servers 140, 150 or 155. Such information may comprise a current location of mobile device 100, recent location history for mobile device 100 (e.g. such as the location of mobile device 100 at hourly intervals for the last 24 to 168 hours), information for each of one or more currently visible or recently visible (e.g. in the last hour) access points and/or femtocells, etc. that may include a MAC address, SSID, global or local cell ID, network ID, or the like. This additional information may be provided by mobile device 100 to one of servers 140. 150 or 155 along with a query to the server for crowdsourcing permission information for one or more crowdsourcing sources designated as tentative, as discussed above. Alternatively or in addition, one or more of servers 140, 150 or 155 may request mobile device 100 to provide this additional information—e.g. after receiving a query from mobile device 100. This additional information may help one or more of servers 140, 150, and/or 155 to make a determination with respect to whether crowdsourcing is allowed and/or restricted, whether an associated geographic area, duration, etc. should be provided, or the like. In some instances, mobile device 100 may interact with the one or more servers 140, 150 and 155 using a SUPL session and/or using the LTE Positioning Protocol (LPP) defined by 3GPP and/or the LPP Extensions (LPPe) protocol defined by OMA though claimed subject matter is not so limited.

It should be noted that even though a certain number of computing platforms, devices, transmitters, etc. are illustrated herein, any number of suitable computing platforms, devices, transmitters, etc. may be implemented to facilitate or otherwise support one or more techniques or processes associated with an example operating environment of FIG. 1. For example, at times, network 130 may be coupled to one or more wired or wireless communications networks (e.g., WiFi, etc.) so as to enhance a coverage area for communications with mobile device 100, base station transceiver 110, local transceiver 115, servers 140, 150, and/or 155, or the like. As was also indicated, in some instances, network 130 may facilitate or support femtocell-based operative regions of coverage, for example. Again, these are merely example implementations, and claimed subject matter is not limited in this regard.

Figure 2:
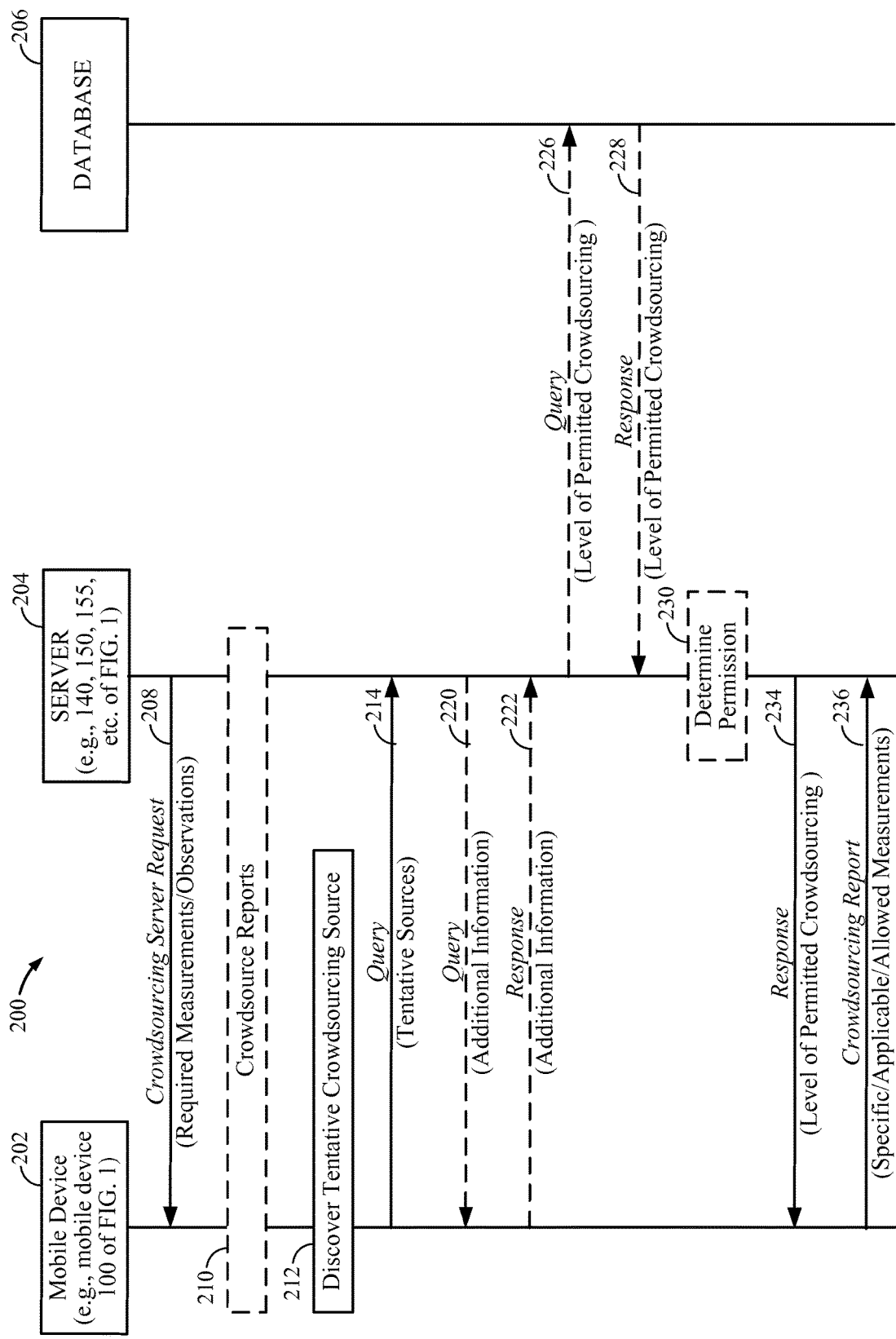
FIG. 2 is a message flow diagram illustrating an implementation of a message exchange process that may facilitate or support techniques for enabling control of privacy for crowdsourcing.

Attention is now drawn to FIG. 2, which is a message flow diagram illustrating an implementation of a message exchange process 200 between a mobile device 202 and a server 204 that may facilitate or support one or more operations or processes for enabling control of privacy for crowdsourcing, such as within the system 10 of FIG. 1. Thus, in some instances, mobile device 202 may comprise or be representative of mobile device 100 of FIG. 1, and server 204 may comprise or be representative of one or more servers (e.g., server 140, 150 or 155 of FIG. 1). In at least one embodiment, mobile device 202 may comprise a SUPL Enabled Terminal (SET), and server 204 may comprise a SUPL Location Platform (SLP) such as an H-SLP or D-SLP. It should be noted that information acquired and/or produced, such as input signals, output signals, operations, results, messages, etc. associated with example process 200 may be represented via one or more RF digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

As illustrated at 208, server 204 may request to start or implement crowdsourcing by sending a crowdsourcing request to mobile device 202. In some instances, a crowdsourcing request at 208 may be transferred to mobile device 202 via a network such as network 130 in FIG. 1. Other messages shown and described as being transferred between mobile device 202 and server 204 in FIG. 1, such as the messages at 210, 212, 214, 220, 222, 234 and 236 may also be transferred through a network (e.g. the same network as at 208 or possible different networks). Claimed subject matter is not limited to a particular communication network infrastructure, of course. The crowdsourcing request at 208 may indicate: (i) the types of APs and/or femtocells for which crowdsourcing measurements are required (e.g. such as indicating IEEE 802.11 WiFi APs, BTLE APs and/or LTE femtocells and/or LTE base stations), (ii) the required measurements, observations, etc. to be performed by mobile device 202 (e.g. such as obtaining RSSI, RTT, S/N, AOA, TOA and/or RSTD measurements), (iii) triggering conditions for obtaining the measurements, observations, etc., (iv)

triggering conditions for returning the measurements, observations, etc. back to server 204, and/or (v) tentative sources for crowdsourcing, or the like. The server 204 may identify tentative sources of crowdsourcing at 208, for example, by providing: (i) the addresses (e.g. the MAC addresses) of particular WiFi APs and/or BTLE APs; (ii) the cell global identifiers (IDs) for particular femtocells and small cells; (iii) the identities or addresses of particular network operators (e.g. a mobile country code (MCC) and mobile network code (MNC)) with an understanding that all APs, femtocells, base stations belonging to these network operators are to be treated as tentative; (iv) the names or identities of venue owners or WLAN operators (e.g. as indicated in an SSID or via other IEEE 802.11 signaling) with an understanding that all APs and femtocells belonging to these venue owners or WLAN owners are to be treated as tentative; (v) particular geographic and/or civic areas such as corresponding to a particular venue, building, building complex, town, city, state or country and with an understanding that all or certain types of APs, femtocells, base stations within the geographic or civic areas are to be treated as tentative; and/or (vi) particular types of APs and/or femtocells (e.g. 802.11g, 801.11b, BTLE) with an understanding that all APs, femtocells and/or base stations conforming to these types are to be treated as tentative. A crowdsourcing request message at 208 may comprise an LPP/LPPe Request Location Information message and/or may be transferred as part of a SUPL session between mobile device 202 and server 204, just to illustrate one possible implementation.

In some instances, having received a request message at 208, mobile device 202 may obtain information, measurements and observations for one or more APs, femtocells and/or base stations etc. as requested at 208 and may send one or more measurement reports containing the obtained information, measurements and observations to server 204 at 210, such as prior to encountering or otherwise discovering a tentative source at 212. It should be noted that transfer of measurement reports at 210 prior to encountering a tentative source at 212 may be optional in certain example implementations—e.g. if all sources for crowdsourcing are indicated as tentative at 208 or if the mobile device 202 discovers a tentative source at 212 prior to being able to obtain and report crowdsourcing measurements at 210.

At 212, mobile device 202 discovers at least one crowdsourcing source that was indicated as being tentative at 208. For example, just prior to 212, mobile device 202 may receive signals from a WiFi AP, BTLE AP or femtocell with a certain address (e.g. MAC address in the case of a WiFi or BTLE AP or a global cell ID in the case of a femtocell), with a certain SSID in the case of a WiFi AP, of a particular type (e.g. IEEE 802.11b, IEEE 802.11n, BTLE, LTE etc.) and/or within a particular area, where the particular address, a portion of the particular address (e.g. corresponding to a particular network operator or owner), the particular type, the particular SSID (or a portion of the particular SSID) and/or the particular area were included at 208 as identifying a crowdsourcing source as tentative. Mobile device 202 may then infer that a tentative crowdsourcing source was encountered. As a consequence, at 214, mobile device 202 may send a query to server 204 indicating that a tentative source for crowdsourcing was discovered.

The query sent by mobile device 202 at 214 may include identification information for the source or sources designated as tentative and discovered by mobile device 202 at 212. At times, identification information may include: an address (e.g., a MAC address, etc.) for an access point; an identity of a cell (e.g., a global cell ID, etc.) supported by a base station, femtocell, small cell, home base station etc.; a type of access point (e.g. an IEEE 802.11 type, a BTLE type, etc.); a current or approximate location for mobile device 202; a location history for mobile device 202; a geographic area within which mobile device 202 is located; or the like. In some embodiments, mobile device 202 may also provide its identity, for example.

Optionally, following receipt of the query at 214, server 204 may query mobile device 202 for additional information at 220, and mobile device 202 may send a response at 222. The query and response at 220 and 222 may not occur in some embodiments. A query at 220 may request specific additional information from mobile device 202, such as: (i) an identity of one or more visible access points, femtocells, base stations that are currently visible and/or were recently visible (e.g. in the last 5-30 minutes) to mobile device 202; (ii) a geographic location of mobile device 202; (iii) measurements by mobile device 100 (e.g. measurements for A-GNSS, OTDOA, WiFi APs) that may enable server 204 to determine a location for mobile device 202; (iv) an identity of one or more networks visible to mobile device 202 and/or recently visible to mobile device 202 (e.g. in the last 5-30 minutes) such as identity for network 130; (v) SSIDs broadcast by one or more access points visible or recently visible to mobile device 202; (vi) a location history of mobile device 202; and/or (vii) the types of one or more access points, femtocells, etc. visible and/or recently visible to mobile device 202.

A response sent at 222 by mobile device 202 to server 204 may include some or all of the information requested at 220 and/or may include information that was not specifically requested at 220. Server 204 may use information related to tentative sources received at 214 and/or information received at 222, if any, to identify one or more sources of crowdsourcing in a vicinity of mobile device 202 (e.g. identities of access points, base stations, wide area networks, local area networks, venues, organizations, etc.), for which mobile device 202 could provide crowdsourcing observations, measurements, etc., if permitted by server 204. In an embodiment, a query at 220 may comprise an LPP/LPPe Request Location Information message or an LPP/LPPe Provide Location Information, and a response at 222 may comprise an LPP/LPPe Request Location Information message or an LPP Provide Location Information message that may each be transferred as part of a SUPL session between mobile device 202 and server 204.

As further illustrated at 226, server 204 may query a database 206 via an appropriate network (e.g. network 130), and may receive a response from the database at 228. The database 206 may correspond to one of servers 240, 250 or 255 or may correspond to some other server that is not part of system 10. Database 206 may be a national register of WiFi and/or BTLE MAC addresses, network IDs, venue SSIDs and/or cell global IDs. Database 206 may instead be a regional (e.g. state level) database of WiFi and/or BTLE MAC addresses, network IDs, venue SSIDs and/or cell global IDs or a similar database owned and operated by a network operator, consumer group or some other organization. Database 206 may contain information indicating permitted and/or not permitted types of crowdsourcing for the various WiFi APs, BTLE APs, femtocells, base stations, networks etc. that are identified directly or indirectly in database 206. Owners and/or managers of WiFi APs, BTLE APs, femtocells, base stations, networks etc. may periodically update database 206 (not shown in FIG. 2) with permitted and/or not permitted types of crowdsourcing. In an embodiment, database 206 may serve as a final authority concerning for which WiFi APs, BTLE APs, femtocells, base stations, networks etc. crowdsourcing is permitted and/or is not permitted and/or which types of crowdsourcing information, measurements and observations are permitted and/or are not permitted to be obtained and crowdsourced for different WiFi APs, BTLE APs, femtocells, base stations, networks etc.

The query at 226 may provide the addresses or identities of particular APs, femtocells, base stations, networks and/or venues etc. that mobile device may have reported at 214 and/or at 222 as being currently visible or recently visible and/or as having been discovered as tentative at 212. The query at 226 may also or instead provide the addresses or identities of particular APs, femtocells, base stations, networks and/or venues etc. that server 204 may have determined as being nearby to mobile device 202 based on information received at 214 and/or at 222.

A response at 228 may include identities of one or more access points, base stations, femtocells, networks, venues and/or organizations, etc. The response at 228 may further indicate explicitly or implicitly a permitted level of crowdsourcing for each of the identified access points, base stations, femtocells, networks, venues and/or organizations, etc. The permitted level of crowdsourcing indicated at 228 may comprise indicating that crowdsourcing is permitted, not permitted, and/or permitted with particular restrictions. The particular restrictions indicated at 228 may indicate particular observations, measurements, etc. that are permitted (e.g. RSSI only, RTT and S/N only, etc.) and/or observations, measurements, etc. that are not permitted (e.g. no RTT and no location, etc.). Optionally or alternatively, a response at 228 may indicate whether crowdsourcing is permitted, not permitted, and/or permitted with restrictions for some or all tentative sources identified in a request at 226 without explicitly identifying the sources (e.g. if identification of these sources can be inferred by server 204 from identities of tentative sources included at 226). Server 204 may store at least a portion of any information received at 228 for later use (e.g. if mobile device 202 or some other mobile device later sends another query regarding permitted crowdsourcing, etc.).

According to an implementation, following one or more of 214, 222, and 228, server 204 may determine at 230 whether crowdsourcing is permitted, not permitted, and/or permitted with restrictions for one or more sources of crowdsourcing such as particular access points, base stations, femtocells, networks, venues and/or organizations, etc. The particular sources of crowdsourcing may include or comprise: (i) the sources discovered by mobile device as being tentative at 212 and reported at 214; (ii) other sources reported at 214 and/or at 222 as being visible or recently visible to mobile device 202; (iii) sources identified by server 204 as being nearby to mobile device 202 (e.g. based on location related information provided by mobile device at 214 and/or 222); and/or (iv) sources distant from mobile device 202 that may be relevant (e.g. due to being at locations at or nearby to locations in a location history provided by mobile device 202 at 214 and/or at 222 and/or at or nearby to locations frequently occurring in such a location history).

The determination at 230 may be based, at least in part, on information received at 228, if any, and/or information stored at server 204, as was indicated. Server 204 may determine a level of permitted crowdsourcing (e.g. nothing, everything, or specific measurements, observations, etc.) for tentative crowdsourcing sources reported at 214, for some (e.g. individual, etc.) tentative crowdsourcing sources reported at 214, for different subsets of tentative crowdsourcing sources reported at 214 (e.g. subsets associated with, or belonging to, the same network, operator, organization or venue, etc.), and/or for crowdsourcing sources not reported at 214 that may be proximate to mobile device 202 or in some way associated with mobile device 202. Server 204 may further determine a geographic area, time and/or duration for which one, some, or all of the level or levels of permitted crowdsourcing may apply. For example, a geographic area may indicate where it may be desired and/or useful for mobile device 202 to apply a permitted level of crowdsourcing, and a time and/or duration may indicate when it may be desired and/or useful for mobile device 202 to apply a permitted level of crowdsourcing. In some instances, such as outside an indicated geographic area and/or outside an indicated time and/or duration it may be useful and/or desired for mobile device 202 to query server 204 for a permitted level of crowdsourcing. It should be noted that operations 226 and 228 may be absent in certain example implementations or may be implemented prior to operations 220-222, for example.

As further illustrated at 234, server 204 may send to mobile device 202 a message indicating a level of permitted crowdsourcing, which may include some or all of the types of permitted and/or not permitted crowdsourcing determined by the server 204 at 230 such as the identities of, or information related to, particular sources for crowdsourcing, whether crowdsourcing is permitted, not permitted or permitted with restrictions for each such source, the particular restrictions in the case of crowdsourcing being permitted with restrictions, a time, duration, and/or geographic area for crowdsourcing, etc. In turn, mobile device 202 may obtain crowdsourcing information, measurements and observations at one time or at a number of separate times (e.g. as indicated by triggers provided at 208) and conforming to the permissions and/or restrictions indicated at 234 and may report the information, measurements and observations to server 204 at 236. In an embodiment, a query at 214 may comprise an LPP/LPPe message, such as an LPP/LPPe Request Location Information message, LPP/LPPe Provide Location Information message, or LPP/LPPe Request Assistance Data message, which may be transferred as part of a SUPL session between mobile device 202 and server 204. In some instances, a response at 234 may comprise an LPP/LPPe message, such as an LPP/LPPe Request Location Information message, LPP/LPPe Provide Location Information message, or LPP/LPPe Provide Assistance Data message, which may be transferred as part of a SUPL session between mobile device 202 and server 204. Of course, these are merely examples relating to messages that may be used herein, at least in part, and claimed subject matter is not so limited.

In some embodiments of the message exchange process 200, several (e.g. physically) different servers may perform the functions described above for server 204. For example, a first server may send the request message at 208; a second server may receive the crowdsourced reports at 210 (if 210 occurs) and at 236; and a third server may receive the query at 214, the response at 222 (if 222 occurs) and the response at 228 (if 228 occurs) and may send the query at 220 (if 220 occurs), the query at 226 (if 226 occurs) and the response at 234. The first server may be a control server that instigates and possibly terminates crowdsourcing by the mobile device 202. The second server may be a data server that receives and stores crowdsourcing reports from mobile device 202 and from other mobile devices. The third server may be a privacy control server that controls privacy for crowdsourcing. In some embodiments, the first and third servers, the first and second servers, or the second and third servers may be the same server. The use of separate servers (e.g. first, second and/or third servers) may be convenient or even necessary to reduce load on some servers, enable servers specialized and engineered for particular tasks, restrict access to sensitive (e.g. crowdsourced) data, restrict control of mobile device 202 to particular entities or organizations, restrict control of privacy to certain authorized entities or organizations, as examples of why separate servers may be useful. In some embodiments, the first server may provide the address of the second server (e.g. a fully qualified domain name (FQDN) or IP address) and/or the address of the third server (e.g. an FQDN or IP address) to the mobile device 202—e.g. as part of the request sent at 208. This may enable the mobile device 202 to send the crowdsourcing reports at 210 (if 210 occurs) and at 236 and to send the query at 214 to the correct server(s).

Figure 3:
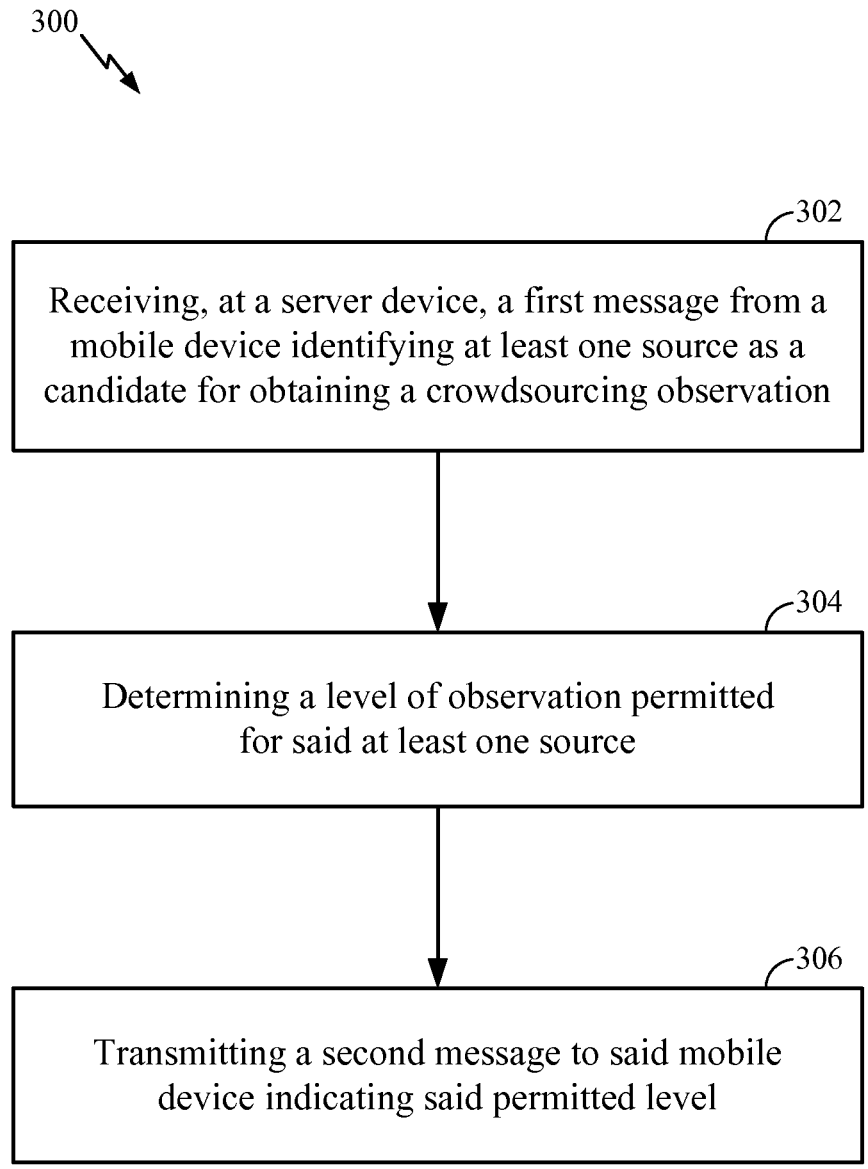
FIG. 3 is a flow diagram illustrating an implementation of an example process for enabling control of privacy for crowdsourcing.

FIG. 3 shows a flow diagram illustrating an implementation of an example process 300 that may be performed, in whole or in part, to facilitate or support one or more operations or techniques for enabling control of privacy for crowdsourcing for use in or with a mobile device, such as mobile device 100 of FIG. 1 and/or mobile device 202 of FIG. 2. In some instances, example process 300 may be performed at or by a suitable server device, such as one or more of servers 140, 150, and/or 155 of FIG. 1, server 204 of FIG. 2, an SLP or the like. It should be noted that information acquired or produced, such as input signals, output signals, operations, results, messages, etc. associated with example process 300 may be represented via one or more RF digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 300 may begin at operation 302 with receiving, at a server device, a first message from a mobile device (e.g. a mobile device such as mobile device 100 or mobile device 202) identifying at least one source as a candidate for obtaining a crowdsourcing observation. Operation 302 may correspond to receiving the Query at 214 in message exchange process 200. As discussed above, a candidate for obtaining a crowdsourcing observation may comprise any source designated by a server device as tentative. Tentative sources may include or may be identified by: (i) particular types of wireless access points (e.g., IEEE 802.11 WiFi access points, Bluetooth APs, BTLE APs, femtocells, LTE femtocells); (ii) particular environments (e.g. indoors, outdoors, urban canyons, etc.); (iii) particular geographic areas; (iv) particular venues (e.g. which may be identified using an SSID or a venue name); (v) certain types of WiFi SSIDs (e.g. an SSID containing a "nomap" indication, etc.); (vi) particular network types (e.g. an LTE network, a WiFi network); (vii) particular network operators (e.g. identified using an network operator ID such as an MCC plus MNC); and/or (viii) particular types of APs and/or femtocells (e.g. IEEE 802.11a, IEEE 802.11b, IEEE 802.11n, BTLE, BTLE version 4.0, LTE etc.). To identify the at least one source, the mobile device may provide at operation 302 at least one of: an identity for an access point (e.g. a MAC address); an identity for a femtocell (e.g. a global cell ID); a geographic location for the mobile device; a location history for the mobile device; a geographic area (e.g. defined using geographic coordinates such as latitude, longitude and possibly altitude or using one or more civic locations); a type of an access point (e.g. IEEE 802.11a, IEEE 802.11g, BTLE); an identity of a network operator (e.g. an MCC plus MNC); an identity of a venue (e.g. an SSID or a venue name); a type of a femtocell (e.g. LTE, WCDMA); or any combination of these.

With regard to operation 304, a level of observation permitted for the at least one source may be determined. Operation 304 may correspond to the determination of permission at 230 in message exchange process 200. Operation 304 may include a server device determining whether crowdsourcing is permitted, not permitted or permitted with restriction for the at least one source identified at operation 302. Alternatively or in addition, if the least one source identified at operation 302 is associated with one or more other entities (e.g. WiFi APs, BTLE APs, femtocells, networks, venues, types of AP, types of femtocell, types of environment, geographic areas) for which crowdsourcing information, measurements and observations may be obtained (e.g. such as for a source that corresponds to a geographic area, network operator, venue, type of AP, type of femtocell), the server device may determine a level of permission (e.g. all crowdsourcing measurements permitted, no crowdsourcing permitted or crowdsourcing permitted with restriction) for one or more of the entities associated with the at least one source. Association in this case may refer to the at least one source comprising, being nearby to, containing or having some other relationship with the one or more associated entities. In the case of crowdsourcing being permitted with restriction for the at least one source and/or for the one or more associated entities, a server device may instigate and/or determine for the at least one source and/or for each of the one or more associated entities one or more permitted and/or not permitted crowdsourcing measurements and observations, such as measurements, observations, etc. with respect to an identity, an address, a location, RSSI, RTT, S/N, AOA, TOA, RSTD etc.

At operation 306, a second message may be transmitted to the mobile device indicating the permitted level. The operation 306 may correspond to the response sent at 234 in message exchange process 200. The second message with a level of permitted observation may indicate whether crowdsourcing is allowed, not allowed or allowed with restrictions for the at least one source identified at operation 302 and/or for each of one or more other associated entities (e.g. WiFi APs, BTLE APs, femtocells, networks, venues, types of AP, types of femtocell, types of environment, geographic areas) and which types of measurements, observations, etc. are allowed to be crowdsourced, etc. In some instances, the second message may indicate: (i) an applicable geographic area for and/or duration of crowdsourcing for which one or more permissions and/or restrictions may apply; (ii) an environment in which crowdsourcing is permitted, not permitted or permitted with restriction (e.g. indoors versus outdoors); (iii) an identity of a network, network operator and/or venue for which crowdsourcing is permitted, not permitted or permitted with restriction; (iv) times of day or days in the week when crowdsourcing is permitted, not permitted or permitted with restriction; or the like. In some instances, the second message may indicate triggering conditions (e.g. a duration, periodic interval, etc.) for obtaining measurements, observations, etc. and, at times, possibly other triggering conditions (e.g. a longer periodic interval, etc.) for reporting the measurements, observations, etc. back to a server device, an overall period for performing crowdsourcing (e.g. one week to one year, etc.), or the like.

In an embodiment, prior to receiving the first message at operation 302, the server device may transmit a third message to the mobile device, the third message designating the at least one source identified as operation 302 as a tentative source for obtaining a crowdsourcing observation. Sending of the third message may correspond to sending the crowdsourcing request at 208 in message exchange process 200. The third message may be sent by the server device to instigate crowdsourcing by the mobile device including possibly specifying: (i) the entities and types of entities for which crowdsourcing is requested (e.g. WiFi APs, BTLE APs, LTE femtocells); (ii) trigger conditions for obtaining crowdsourcing measurements (e.g. a periodic interval, detection of being in a particular environment, country, geographic area etc., detection of some minimum number of nearby WiFi APs and/or BTLE APs, detection of being in coverage of a particular network); (iii) trigger conditions for reporting crowdsourcing measurements and information (e.g. a periodic interval); (iv) a duration or other trigger condition for ceasing to obtain and report crowdsourcing measurements; and (v) the types of information and measurements required for each entity or each type of entity for which crowdsourcing is requested (e.g. such a identity or address and/or measurements of RSSI, RTT, S/N, AOA, RSTD etc.).

The third message may also indicate certain sources of crowdsourcing as being tentative. Tentative sources may include the source identified at operation 302. Tentative sources may generally include any of the types of sources described for the particular source identified at operation 302. The mobile device may then send the first message for operation 302 if the mobile device discovers or encounters the particular tentative source identified at operation 302—e.g. by receiving signals from some AP or femtocell that is the identified source or is associated with the identified source (e.g. due to being within, nearby to or having some other relationship to the identified source).

In another embodiment, after receiving the first message at operation 302, the server device may transmit a fourth message to a database, the fourth message comprising a request for privacy information related to the at least one source identified at operation 302. The server device may then receive a fifth message from the database comprising the privacy information requested by the fourth message. Determining a level of observation permitted for the at least one source at operation 304 may be based, at least in part, on the privacy information received in the fifth message. In an embodiment, sending the fourth message may correspond to sending the query at 226 in message exchange process 200 and receiving the fifth message may correspond to receiving the response at 228 in message exchange process 200. The fourth message may be sent to a database that is as repository of privacy related information for a country, state or organization. The database may then return privacy related information for the at least one source queried in the fourth message.

In another embodiment, after receiving the first message at operation 302, the server device may transmit a sixth message to the mobile device comprising a request for additional information related to the at least one source identified at operation 302. The server device may then later receive a seventh message from the mobile device comprising the additional information. The server device may then determine a level of observation permitted for the at least one source at operation 304 based, at least in part, on the additional information in the seventh message. In an embodiment, sending the sixth message may correspond to sending the query at 220 in message exchange process 200 and receiving the seventh message may correspond to receiving the response at 222 in message exchange process 200. As described for message exchange process 200, the sixth and seventh messages may enable the server device to request and the mobile device to return, respectively, information relevant to and/or specific to the at least one source identified at operation 302, such as the geographic location of the mobile device, a location history for the mobile device, a type of environment for the mobile device, a geographic area (e.g. within which the mobile device is located), an identification of a venue (e.g. visible to the mobile device), an identification of a network or network operator providing coverage to the mobile device, the identities or addresses of visible APs and/or femtocells, a type of AP and/or type of femtocell (e.g. visible to the mobile device). The additional information may assist the server device to determine a level of observation permitted for the at least one source at operation 304 and/or for other sources associated with this source.

Figure 4:
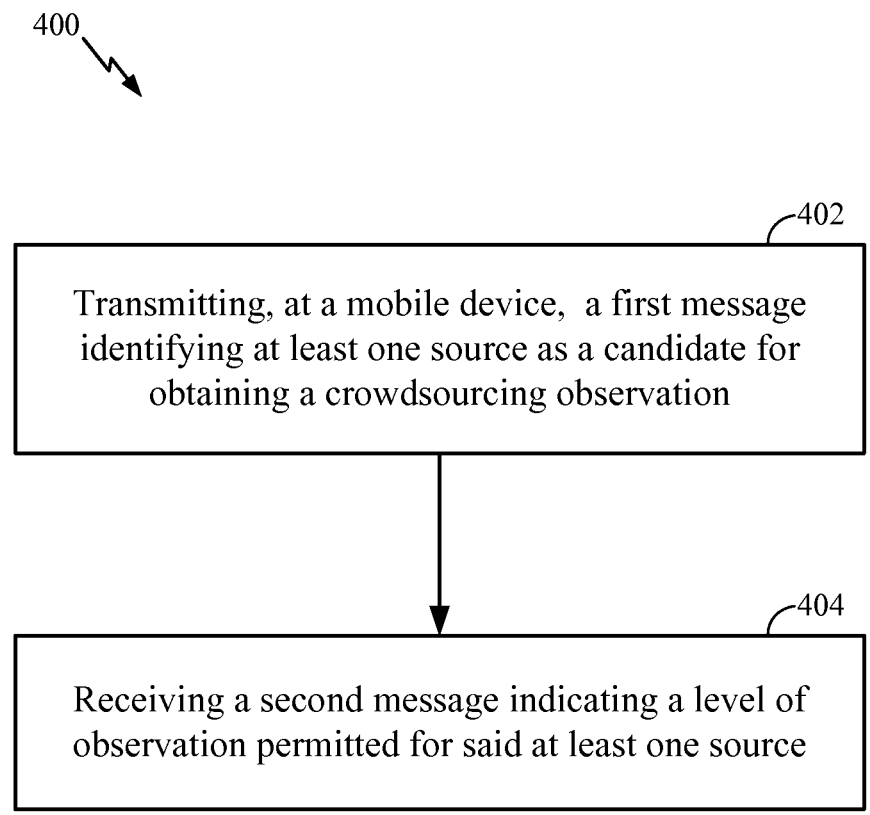
FIG. 4 is a flow diagram illustrating another implementation of an example process for enabling control privacy for crowdsourcing.

FIG. 4 is a flow diagram illustrating an implementation of an example process 400 that may be performed, in whole or in part, to facilitate or support one or more operations or techniques for enabling control of privacy for crowdsourcing for use in or with a mobile device, such as mobile device 100 of FIG. 1, mobile device 202 of FIG. 2, and/or a SET. Example process 400 may begin at operation 402 with transmitting, at a mobile device, a first message identifying at least one source as a candidate for obtaining a crowdsourcing observation. In an embodiment, transmitting the first message may correspond to sending the query at 214 in message exchange process 200. At times, the first message may comprise a query sent by the mobile device in response to a crowdsourcing request, as discussed above, and may include identification or other suitable information for any source designated as tentative and/or encountered by the mobile device. For example, the first message may identify the at least one source by providing an identity for an access point (e.g. a MAC address); an identity for a femtocell (e.g. a global cell ID); a geographic location (e.g. a current or recent geographic location for the mobile device); a location history for the mobile device; a geographic area (e.g. within which the mobile device is or recently was located); a type of an access point (e.g. visible to the mobile device); an identity of a network operator; an identity of a venue; a type of a femtocell; or any combination of these. The at least one source may previously have been designated as a tentative source for crowdsourcing by the server and have been discovered or otherwise encountered by the mobile device. Tentative sources, such as the source identified at operation 402, may include or be associated with: (i) particular types of wireless access points (e.g., IEEE 802.11 WiFi access points, Bluetooth APs, BTLE APs, femtocells, LTE femtocells); (ii) particular environments (e.g. indoors, outdoors, urban canyons, etc.); (iii) particular geographic area; (iv) particular venues (e.g. which may be identified using an SSID or a venue name); (v) certain types of WiFi SSIDs (e.g. an SSID containing a "nomap" indication, etc.); (vi) particular network types (e.g. an LTE network, a WiFi network); (vii) particular network operators (e.g. identified using an network operator ID such as an MCC plus MNC); and/or (viii) particular types of APs and/or femtocells (e.g. IEEE 802.11a, IEEE 802.11b, IEEE 802.11n, BTLE, BTLE version 4.0, LTE etc.).

With regard to operation 404, a second message may be received indicating a level of observation permitted for the at least one source identified at operation 402. In an embodiment, receiving the second message may correspond to receiving the response at 234 in message exchange process 200. The level of a permitted observation received at operation 404 may indicate whether crowdsourcing is permitted (e.g. without restriction), not permitted or permitted with restriction. In the case of permission with restriction, the level of a permitted observation received at operation 404 may indicate the types of measurements, observations, etc. that are allowed and/or not allowed to be crowdsourced (e.g. RSSI, RTT, S/N, AOA, RSTD). The level of a permitted observation received at operation 404 may also or instead indicate an applicable geographic area (or areas) for, and/or duration of, crowdsourcing, an environment in which crowdsourcing is permitted or not permitted (e.g. indoors versus outdoors), an identity of a network, network operator and/or venue for which crowdsourcing is permitted or not permitted, or the like. In some instances, the second message may comprise triggering conditions (e.g. a duration, periodic interval, etc.) for obtaining measurements, observations, etc. and, at times, possibly other triggering conditions (e.g. a longer periodic interval, etc.) for reporting the measurements, observations, etc. back to a server device, or the like. Depending on an implementation, the level of permitted observation received at operation 404 may have been determined by a server device based, at least in part, on one or more communications with a suitable database (e.g. a national register of AP MAC addresses, network IDs and/or venue SSIDs, etc.) and/or on previously received information for such a database indicating permitted and/or not permitted measurements, observations, etc., or the like, as discussed above.

In an embodiment, prior to transmitting the first message at operation 402, the mobile device may receive a third message designating the at least one source identified at operation 402 as a tentative source for obtaining a crowdsourcing observation. In an embodiment, receiving the third message may correspond to receiving the request at 208 in message exchange 200. The third message may be sent by a server device to instigate crowdsourcing by the mobile device including possibly specifying: (i) the entities and types of entities for which crowdsourcing is requested (e.g. WiFi APs, BTLE APs, LTE femtocells); (ii) triggers conditions for obtaining crowdsourcing measurements (e.g. a periodic interval, detection of being in a particular environment, country, geographic area etc., detection of some minimum number of nearby WiFi APs and/or BTLE APs, detection of being in coverage of a particular network); (iii) trigger conditions for reporting crowdsourcing measurements and information (e.g. a periodic interval); (iv) a duration or other trigger condition for ceasing to obtain and report crowdsourcing measurements; and/or (v) the types of information and measurements required for each entity or type of entity for which crowdsourcing is requested (e.g. such a identity or address, a location, measurements of RSSI, RTT, S/N, AOA, RSTD etc.). The third message may also indicate certain sources of crowdsourcing as being tentative. Tentative sources may include the at least one source identified at operation 402. The mobile device may then transmit the first message for operation 402 if the mobile device discovers or encounters the particular tentative source identified at operation 402—e.g. by receiving signals from some AP or femtocell that is the identified source or is associated with the identified source (e.g. due to being within, nearby to or having some other relationship to the identified source).

In an embodiment, after transmitting the first message at operation 402 but before receiving the second message at operation 404, the mobile device may receive a fourth message comprising a request for additional information related to the at least one source identified at operation 402. The mobile device may then transmit a fifth message comprising the additional information requested in the fourth message. In an embodiment, receiving the fourth message may correspond to receiving the query at 220 in message exchange process 200 and transmitting the fifth message may correspond to sending the response at 222 in message exchange process 200. As described for message exchange process 200, the fourth and fifth messages may enable a server device to request and the mobile device to return, respectively, information relevant to and/or specific to the at least one source identified at operation 402, such as the geographic location of the mobile device, a location history for the mobile device, a type of environment for the mobile device, a geographic area (e.g. within which the mobile device is located), an identification of a venue (e.g. visible to the mobile device), an identification of a network or network operator providing coverage to the mobile device, the identities or addresses of visible APs and/or femtocells, a type of AP and/or type of femtocell (e.g. visible to the mobile device). The additional information may assist the server device to determine the level of observation permitted for the at least one source that is received at operation 404.

Accordingly, as discussed herein, enabling control of privacy for crowdsourcing may provide benefits. For example, one or more operations or techniques discussed herein may help a mobile device to avoid the need to support different types of privacy procedures, such as a specific indication and/or flag with some level of required or requested privacy, which may not be supported by older types of crowdsourcing mobile devices. Enabling privacy for crowdsourcing, as discussed herein, may also relieve a mobile device from responsibility for making one or more crowdsourcing determinations, which may vary between different countries, states, organizations, etc. and may further vary in time (e.g., where a country or organization changes its privacy requirements after a period of time). In addition, unlike an approach where mobile devices are allowed to crowdsource available information with filtering occurring inside a server, enabling control of privacy for crowdsourcing, such as discussed herein, may be more transparent and/or verifiable, and may therefore allow for correct and/or appropriate crowdsourcing, data privacy compliance, etc. to be more easily verified. Of course, such a description of certain aspects of enabling privacy for crowdsourcing and its benefits is merely an example, and claimed subject matter is not so limited.

Figure 5:
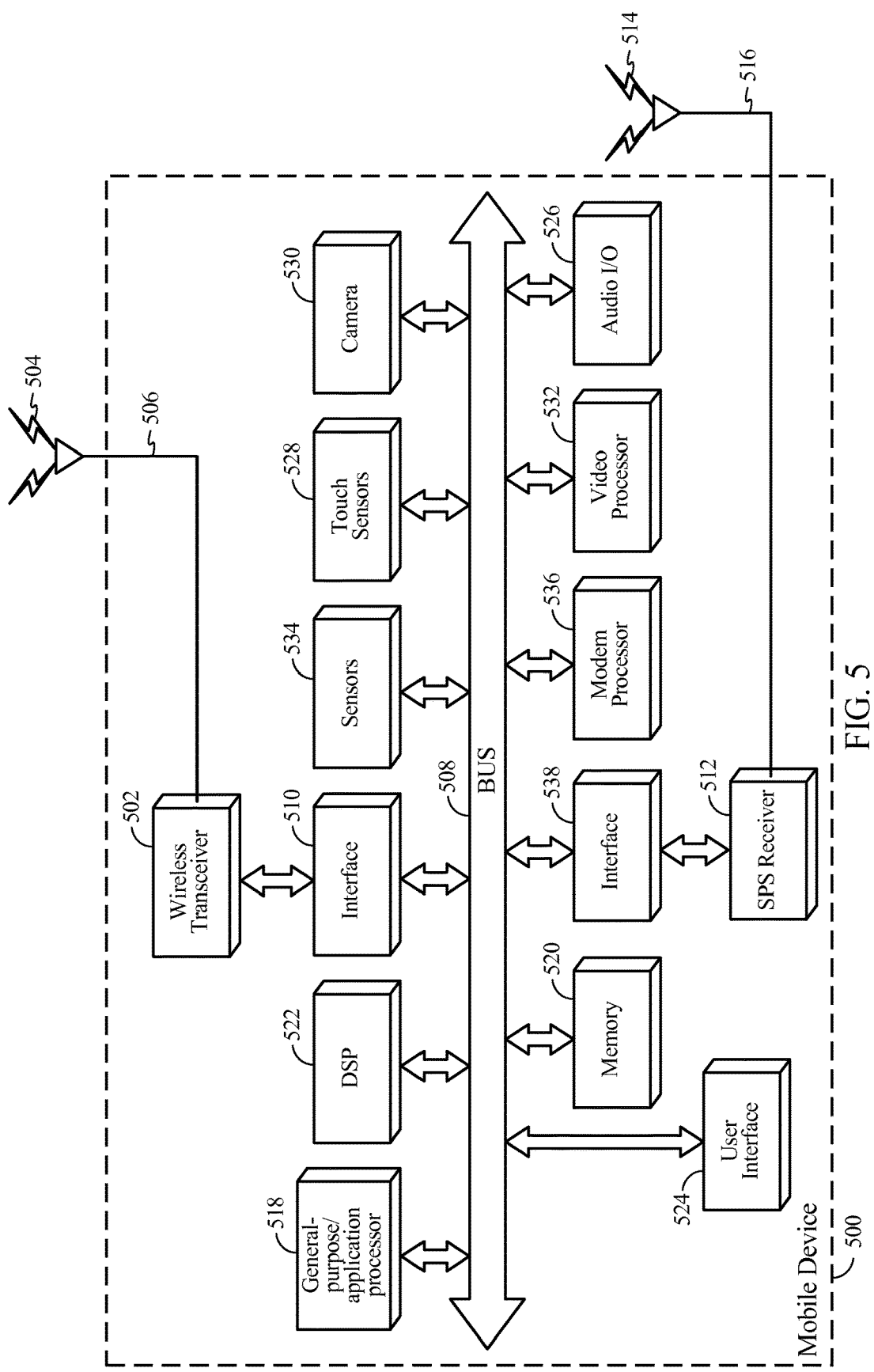
FIG. 5 is a schematic diagram illustrating an implementation of an example computing environment associated with a mobile device.

FIG. 5 is a schematic diagram of an implementation of an example computing environment associated with a mobile device that may be used, at least in part, to facilitate or support one or more operations or techniques for enabling control of privacy for crowdsourcing. An example computing environment may comprise a mobile device 500 that may include one or more features or aspects of mobile device 100 of FIG. 1 and/or 202 of FIG. 2, and/or a mobile device that performs the process 400 of FIG. 4, though claimed subject matter is not so limited. For example, in some instances, mobile device 500 may comprise a wireless transceiver 502 capable of transmitting or receiving wireless signals, referenced generally at 504, such as via an antenna 506 over a suitable wireless communications network. Wireless transceiver 502 may be capable of sending or receiving one or more suitable communications, such as one or more communications discussed with reference to FIGS. 1-4, as one possible example. Wireless transceiver 502, possibly in conjunction with modem processor 536, may be used to receive and measure signals from WiFi APs, BTLE APs, femtocells, base stations etc. in order to obtain measurements, observations and/or other information as described herein to support crowdsourcing.

Wireless transceiver 502 may be coupled or connected to a bus 508 via a wireless transceiver bus interface 510. Depending on an implementation, at times, wireless transceiver bus interface 510 may be at least partially integrated with wireless transceiver 502. Some implementations may include multiple wireless transceivers 502 or antennas 506 so as to enable transmitting or receiving signals according to a corresponding multiple wireless communication standards such as IEEE 802.11 WiFi, Code Division Multiple Access (CDMA), Wideband CDMA (WCDMA), Long Term Evolution (LTE), Bluetooth, just to name a few examples.

In an implementation, mobile device 500 may comprise an SPS or like receiver 512 capable of receiving or acquiring one or more SPS or other suitable wireless signals 514, such as via an SPS or like antenna 516 (which may be the same as or different to antenna 506). SPS receiver 512 may process, in whole or in part, one or more acquired SPS signals 514 for estimating or enabling (e.g. by a location server) a location, coarse or otherwise, of mobile device 500. In some instances, one or more general-purpose application processors 518, memory 520, digital signal processor(s) (DSP) 522, or like specialized devices or processors not shown may be utilized to process acquired SPS signals 514, in whole or in part, calculate, or enable calculation of, a location of mobile device 500, such as in conjunction with SPS receiver 512, or the like. Storage of SPS or other signals for implementing one or more positioning operations, such as in connection with one or more techniques for enabling control of privacy for crowdsourcing may be performed, at least in part, in memory 520, suitable registers or buffers (not shown). Although not shown, it should be appreciated that in at least one implementation one or more processors 518, memory 520, DSPs 522, or like specialized devices or processors may comprise one or more processing modules capable of transmitting a first message identifying at least one source as a candidate for obtaining a crowdsourcing observation; and receiving a second message indicating a level of the crowdsourcing observation permitted for the at least one source. It should also be noted that all or part of one or more processing modules may be implemented using or otherwise including hardware, firmware, software, or any combination thereof.

As illustrated, DSP 522 may be coupled or connected to processor 518 and memory 520 via bus 508. Although not shown, in some instances, bus 508 may comprise one or more bus interfaces that may be integrated with one or more applicable components of mobile device 500, such as DSP 522, processor 518, memory 520, or the like. In various embodiments, one or more operations or functions described herein may be performed in response to execution of one or more machine-readable instructions stored in memory 520, such as on a computer-readable storage medium, such as RAM, ROM, FLASH, disc drive, etc., just to name a few examples. Instructions may be executable via processor 518, one or more specialized processors not shown, DSP 522, or the like. Memory 520 may comprise a non-transitory processor-readable memory, computer-readable memory, etc. that may store software code (e.g., programming code, instructions, etc.) that may be executable by processor 518, DSP 522, or the like to perform operations or functions described herein.

Mobile device 500 may comprise a user interface 524, which may include any one of several devices such as a speaker, microphone, display device, vibration device, keyboard, touch screen, etc., just to name a few examples. In at least one implementation, user interface 524 may enable a user to interact with one or more applications hosted on mobile device 500. For example, one or more devices of user interface 524 may store analog or digital signals on memory 520 to be further processed by DSP 522, processor 518, etc. in response to input or action from a user. Similarly, one or more applications hosted on mobile device 500 may store analog or digital signals in memory 520 to present an output signal to a user. In some implementations, mobile device 500 may optionally include a dedicated audio input/output (I/O) device 526 comprising a dedicated speaker, microphone, digital to analog circuitry, analog to digital circuitry, amplifiers, gain control, or the like. It should be understood, however, that this is merely an example of how audio I/O device 526 may be implemented, and that claimed subject matter is not limited in this respect. As seen, mobile device 500 may comprise one or more touch sensors 528 responsive to touching or like pressure applied on a keyboard, touch screen, or the like.

In an implementation, mobile device 500 may comprise a camera 530, dedicated or otherwise, such as for capturing still or moving imagery, or the like. Camera 530 may comprise a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may be performed, at least in part, at processor 518, DSP 522, or the like. Optionally or alternatively, a video processor 532, dedicated or otherwise, may perform conditioning, encoding, compression, or manipulation of signals representing one or more captured images. Additionally, video processor 532 may decode or decompress one or more stored images for presentation on a display (not shown) of mobile device 500.

Mobile device 500 may comprise one or more sensors 534 coupled or connected to bus 508, such as one or more inertial sensors, ambient environment sensors, or the like. Inertial sensors of sensors 534 may comprise one or more accelerometers (e.g., collectively responding to acceleration of mobile device 500 in one, two, or three dimensions, etc.), gyroscopes or magnetometers (e.g., to support one or more compass or like applications, etc.), etc., just to illustrate a few examples. Ambient environment sensors of mobile device 500 may comprise one or more barometric pressure sensors, temperature sensors, ambient light detectors, camera sensors, microphones, etc., just to name few examples. Sensors 534 may generate analog or digital signals that may be stored in memory 520 and may be processed by DSP 522, processor 518, etc., such as in support of one or more applications directed to positioning or navigation operations, wireless communications, gaming or the like.

In a particular implementation, mobile device 500 may comprise a modem processor 536, dedicated or otherwise, capable of performing baseband processing of signals received or downconverted via wireless transceiver 502, SPS receiver 512, or the like. Similarly, modem processor 536 may perform baseband processing of signals to be upconverted for transmission via wireless transceiver 502, for example. In alternative implementations, instead of having a dedicated modem processor, baseband processing may be performed, at least in part, by processor 518, DSP 522, or the like. In addition, in some instances, an interface 538, although illustrated as a separate component, may be integrated, in whole or in part, with one or more applicable components of mobile device 500, such as bus 508 or SPS receiver 512, for example. Optionally or alternatively, SPS receiver 512 may be coupled or connected to bus 508 directly. It should be understood, however, that these are merely examples of components or structures that may perform baseband processing, and that claimed subject matter is not limited in this regard.

Figure 6:
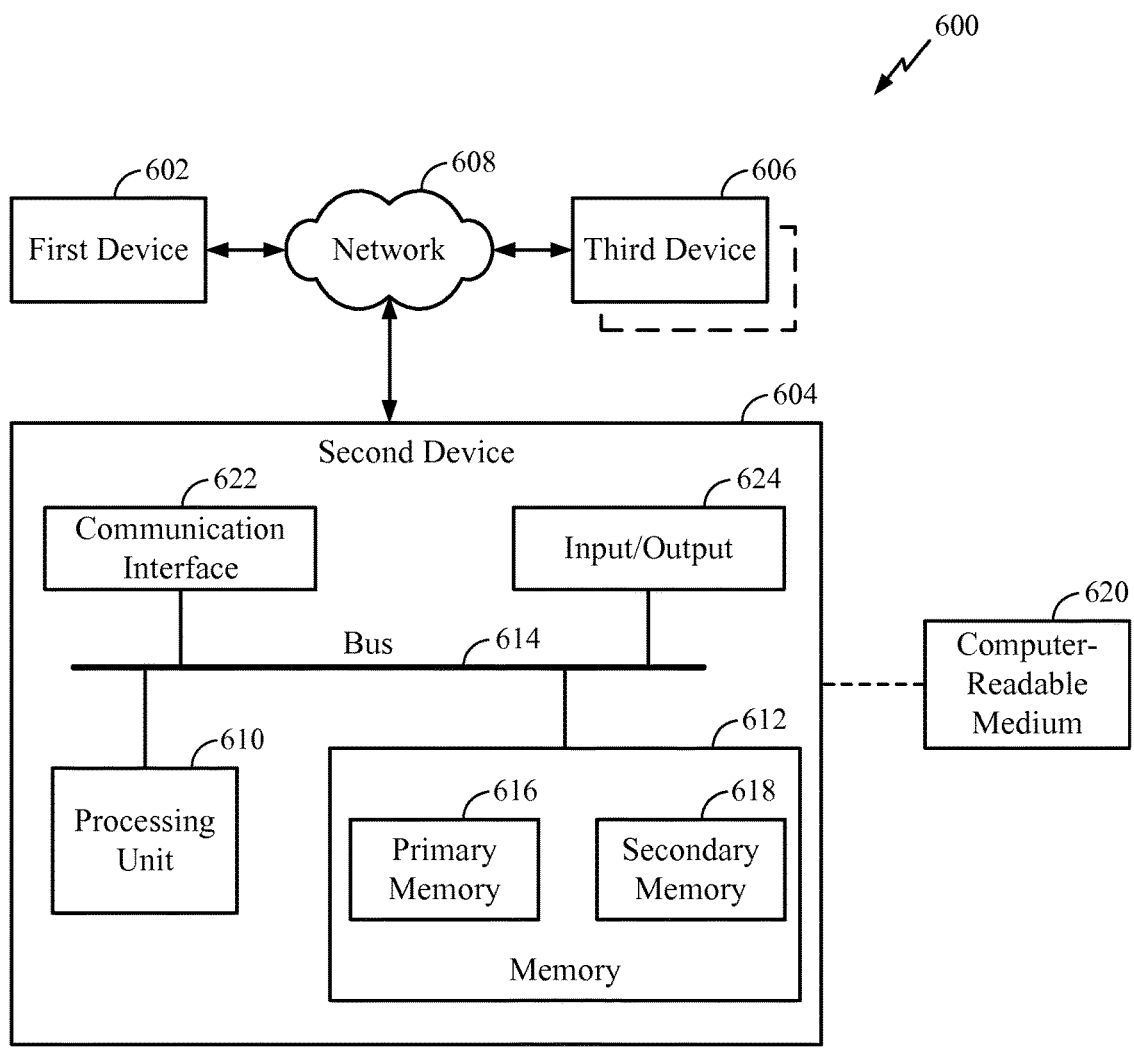
FIG. 6 is a schematic diagram illustrating an implementation of an example computing environment associated with a server.

FIG. 6 is a schematic diagram illustrating an implementation of an example computing environment 600 that may include one or more servers or other devices capable of partially or substantially implementing or supporting one or more operations or processes for enabling control of privacy for crowdsourcing, as discussed above in connection with FIGS. 1-4, for example. Computing environment 600 may include a first device 602, a second device 604, a third device 606, etc., which may be operatively coupled together via a communications network 608.

First device 602, second device 604, or third device 606 may be representative of any device, appliance, platform, or machine that may be capable of exchanging information over communications network 608. By way of example but not limitation, any of first device 602, second device 604, or third device 606 may correspond to any of servers 140, 150, 155 or 204, database 206 or a server that performs the process 300 of FIG. 3. Any of first device 602, second device 604, or third device 606 may correspond to one or more computing devices or platforms, such as a desktop computer, a laptop computer, a workstation, a server device, or the like; one or more personal computing or communication devices or appliances, such as a personal digital assistant, mobile communication device, or the like; a computing system or associated service provider capability, such as a database or information storage service provider/system, a network service provider/system, an Internet or intranet service provider/system, a portal or search engine service provider/system, a wireless communication service provider/system; or any combination thereof. Any of first, second, or third devices 602, 604, and 606, respectively, may comprise one or more of a mobile device, wireless transmitter, server, etc. in accordance with example implementations described herein.

In an implementation, communications network 608 may be representative of one or more communication links, processes, or resources capable of supporting an exchange of information between at least two of first device 602, second device 604, or third device 606. By way of example but not limitation, communications network 608 may correspond to network 130, may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated via a dashed lined box partially obscured by third device 606, there may be additional like devices operatively coupled to communications network 608. It is also recognized that all or part of various devices or networks shown in computing environment 600, or processes or methods, as described herein, may be implemented using or otherwise including hardware, firmware, software, or any combination thereof.

By way of example but not limitation, second device 604 may include at least one processing unit 610 that may be operatively coupled to a memory 612 via a bus 614. Processing unit 610 may be representative of one or more circuits capable of performing at least a portion of a suitable computing procedure or process. For example, processing unit 610 may include one or more processors, controllers, microprocessors, microcontrollers, application specific integrated circuits, digital signal processors, programmable logic devices, field programmable gate arrays, or the like, or any combination thereof. Although not shown, second device 604 may include a location-tracking unit that may initiate a coarse position fix of a mobile device of interest, such as in an indoor or like area of interest based, at least in part, on one or more recently received or acquired wireless signals, such as from an SPS. In some implementations, a location-tracking unit may be at least partially integrated with a suitable processing unit, such as processing unit 610 though claimed subject matter is not so limited. In certain server-based or server-supported implementations, processing unit 610 may comprise means for receiving a first message from a mobile device identifying at least one source as a candidate for obtaining a crowdsourcing observation; means for determining a level of observation permitted for the at least one source; and means for transmitting a second message to the mobile device indicating the permitted level. In some instances, processing unit 610 may comprise means for sending a third message to the mobile device prior to receiving the first message, the third message designating the at least one source as a tentative source for obtaining the crowdsourcing observation. Depending on an implementation, processing unit 610 may also comprise means for sending a fourth message to a database, the fourth message comprising a request for privacy information related to the at least one source; and means for receiving a fifth message from the database comprising the privacy information, wherein the determining the level of observation permitted for the at least one source is based, at least in part, on the privacy information in the fifth message. In some instances, processing unit 610 may also comprise means for sending a sixth message to the mobile device comprising a request for additional information related to the at least one source; and means for receiving a seventh message comprising the additional information, wherein the determining the level of observation permitted for the at least one source is based, at least in part, on the additional information in the seventh message and wherein the sixth message is sent after receiving the first message.

Memory 612 may be representative of any information storage mechanism or appliance. Memory 612 may include a primary memory 616 and a secondary memory 618. Primary memory 616 may include a random access memory, read only memory, etc. While illustrated in this example as being separate from processing unit 610, it should be understood that all or part of primary memory 616 may be provided within or otherwise co-located/coupled with processing unit 610. Secondary memory 618 may include same or similar type of memory as primary memory or one or more information storage devices or systems, such as a disk drive, an optical disc drive, a tape drive, a solid state memory drive, etc. In certain implementations, secondary memory 618 may be operatively receptive of, or otherwise capable of being coupled to, a computer-readable medium 620. Computer-readable medium 620 may include any non-transitory storage medium that may carry or make accessible information, code, or instructions for one or more of devices in computing environment 600. Computer-readable medium 620 may also be referred to as a storage medium.

Second device 604 may include a communication interface 622 that may provide for or otherwise support an operative coupling of second device 604 to at least communications network 608. By way of example but not limitation, communication interface 622 may include a network interface device or card, a modem, a router, a switch, a transceiver, and the like. Second device 604 may also include an input/output device 624. Input/output device 624 may be representative of one or more devices or features that may be configurable to accept or otherwise introduce human or machine inputs, or one or more devices or features that may be capable of delivering or otherwise providing for human or machine outputs. By way of example but not limitation, input/output device 624 may include an operatively configured display, speaker, keyboard, mouse, trackball, touch screen, information port, or the like.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform functions described herein. Any machine readable medium tangibly embodying instructions may be used in implementing methodologies described herein. For example, software codes may be stored in a memory and executed by a processor. Memory may be implemented within the processor or external to the processor. As used herein the term "memory" refers to any type of long term, short term, volatile, non-volatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating a location, communicating with a suitable server, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated Wi-Fi, for example. However, such details relating to femtocells are merely examples, and claimed subject matter is not so limited.

In some implementations, a mobile device may, for example, be capable of communicating with one or more access points, such as for the purpose of estimating a location, communicating with a suitable server, or the like. As used herein, the term "access point" is meant to include any wireless communication station and/or device used, at least in part, to facilitate communication in a wireless communications system, such as, for example, a wireless local area network, although the scope of claimed subject matter is not limited in this respect. Also, as used herein, the terms "access point" and "wireless transmitter" may be used interchangeably. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network, such as the Internet, for example.

Also, if applicable, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
   providing, to a mobile device via a server device, indications of one or more particular sources, distinct from said server device, as having one or more privacy requirements for obtaining a crowdsourcing observation by said mobile device;
   receiving, at said server device, a first message from said mobile device identifying at least one source of said one or more particular sources as a candidate for obtaining said crowdsourcing observation;
   determining a permitted level of crowdsourcing observation for said at least one source based, at least in part, on said one or more privacy requirements; and
   transmitting a second message to said mobile device indicating said permitted level.

2. The method of claim 1, wherein said first message identifies said at least one source using at least one of the following: an identity for an access point; an identity for a femtocell; a geographic location for said mobile device; a location history for said mobile device; a geographic area; a type of an access point; an identity of a network operator; an identity of a venue; a type of a femtocell; or any combination thereof.

3. The method of claim 1, and further comprising:
   transmitting a third message to said mobile device prior to receiving said first message, said third message designating said at least one source as a tentative source for obtaining said crowdsourcing observation.

4. The method of claim 1, and further comprising:
   transmitting a fourth message to a database, said fourth message comprising a request for privacy information related to said at least one source; and
   receiving a fifth message from said database comprising said privacy information, wherein said determining said level of crowdsourcing observation permitted for said at least one source is based, at least in part, on said privacy information in said fifth message.

5. The method of claim 1, and further comprising:
transmitting a sixth message to said mobile device comprising a request for additional information related to said at least one source; and
receiving a seventh message comprising said additional information, wherein said determining said level of crowdsourcing observation permitted for said at least one source is based, at least in part, on said additional information in said seventh message and wherein said sixth message is sent after receiving said first message.

6. The method of claim 5, wherein said additional information in said seventh message comprises at least one of the following: an identity for an access point; an identity for a femtocell; a geographic location for said mobile device; a location history for said mobile device; a geographic area; a type of an access point; a type of a femtocell; an identity of a network operator; an identity of a venue; or any combination thereof.

7. The method of claim 1, wherein said at least one source comprises at least one of the following: an IEEE 802.11 Wi-Fi access point; a Bluetooth® access point; a Bluetooth Low Energy (BTLE) access point, an LTE femtocell; a geographic area; or any combination thereof.

8. The method of claim 1, wherein said at least one source is identified via at least one of the following: a Media Access Control (MAC) address; a cell global identifier; a location; or any combination thereof.

9. The method of claim 1, wherein said server device comprises a Secure User Plane Location (SUPL) Location Platform (SLP).

10. The method of claim 1, wherein said first and said second messages are transmitted using at least one of the following: a SUPL session; an LTE Positioning Protocol (LPP); an LPP Extensions (LPPe) protocol; or any combination thereof.

11. An apparatus comprising:
means for providing, to a mobile device via a server device, indications of one or more particular sources, distinct from said server device, as having one or more privacy requirements for obtaining a crowdsourcing observation by a mobile device;
means for receiving a first message from said mobile device identifying at least one source of said one or more particular sources as a candidate for obtaining said crowdsourcing observation;
means for determining a permitted level of crowdsourcing observation for said at least one source based, at least in part, on said one or more privacy requirements; and
means for transmitting a second message to said mobile device indicating said permitted level.

12. The apparatus of claim 11, wherein said first message identifies said at least one source using at least one of the following: an identity for an access point; an identity for a femtocell; a geographic location for said mobile device; a location history for said mobile device; a geographic area; a type of an access point; a type of a femtocell; or any combination thereof.

13. The apparatus of claim 11, and further comprising:
means for transmitting a third message to said mobile device prior to receiving said first message, said third message designating said at least one source as a tentative source for obtaining said crowdsourcing observation.

14. The apparatus of claim 13, and further comprising:
means for transmitting a fourth message to a database, said fourth message comprising a request for privacy information related to said at least one source; and
means for receiving a fifth message from said database comprising said privacy information, wherein said determining said level of crowdsourcing observation permitted for said at least one source is based, at least in part, on said privacy information in said fifth message.

15. The apparatus of claim 14, and further comprising:
means for transmitting a sixth message to said mobile device comprising a request for additional information related to said at least one source; and
means for receiving a seventh message comprising said additional information, wherein said determining said level of crowdsourcing observation permitted for said at least one source is based, at least in part, on said additional information in said seventh message and wherein said sixth message is sent after receiving said first message.

16. The apparatus of claim 15, wherein said additional information in said seventh message comprises at least one of the following: an identity for an access point; an identity for a femtocell; a geographic location for said mobile device; a location history for said mobile device; a geographic area; a type of an access point; a type of a femtocell; or any combination thereof.

17. A server comprising:
a wireless transceiver to communicate with an electronic communications network; and
one or more processors coupled to a memory and configured to:
provide indications of one or more particular sources, distinct from said server, as having one or more privacy requirements for obtaining a crowdsourcing observation by a mobile device;
obtain a first message received at said wireless transceiver from said mobile device identifying at least one source of said one or more particular sources as a candidate for obtaining said crowdsourcing observation;
determine a permitted level of crowdsourcing observation for said at least one source based, at least in part, on said one or more privacy requirements; and
initiate transmission of a second message via said wireless transceiver to said mobile device indicating said permitted level.

18. The server of claim 17, wherein said first message identifies said at least one source using at least one of the following: an identity for an access point; an identity for a femtocell; a geographic location for said mobile device; a location history for said mobile device; a geographic area; a type of an access point; a type of a femtocell; or any combination thereof.

19. The server of claim 17, wherein said one or more processors are further configured to:
initiate transmission of a third message via said wireless transceiver to said mobile device prior to receiving said first message, said third message designating said at least one source as a tentative source for obtaining said crowdsourcing observation.

20. The server of claim 19, wherein said one or more processors are further configured to:
initiate transmission of a fourth message via said wireless transceiver to a database, said fourth message comprising a request for privacy information related to said at least one source; and obtain a fifth message received at said wireless transceiver from said database comprising said privacy information, wherein said determining said level of crowdsourcing observation permitted for said at least one source is based, at least in part, on said privacy information in said fifth message.

21. The server of claim 20, wherein said one or more processors are further configured to:
initiate transmission of a sixth message via said wireless transceiver to said mobile device comprising a request for additional information related to said at least one source; and
obtain a seventh message received at said wireless transceiver comprising said additional information, wherein said determining said level of crowdsourcing observation permitted for said at least one source is based, at least in part, on said additional information in said seventh message and wherein said sixth message is sent after receiving said first message.

22. The server of claim 21, wherein said additional information in said seventh message comprises at least one of the following: an identity for an access point; an identity for a femtocell; a geographic location for said mobile device; a location history for said mobile device; a geographic area; a type of an access point; a type of a femtocell; or any combination thereof.

23. An article comprising:
a non-transitory storage medium having instructions executable by a processor to:
provide, to a mobile device via a server device, indications of one or more particular sources, distinct from said server device, as having one or more privacy requirements for obtaining a crowdsourcing observation by said mobile device;
obtain a first message received from said mobile device identifying at least one source of said one or more particular sources as a candidate for obtaining said crowdsourcing observation;
determine a permitted level of crowdsourcing observation for said at least one source based, at least in part, on said one or more privacy requirements; and
initiate transmission of a second message to said mobile device indicating said permitted level.

24. The article of claim 23, wherein said first message identifies said at least one source using at least one of the following: an identity for an access point; an identity for a femtocell; a geographic location for said mobile device; a location history for said mobile device; a geographic area; a type of an access point; an identity of a network operator; an identity of a venue; a type of a femtocell; or any combination thereof.

25. A method comprising:
receiving, from a server device, a crowdsourcing request identifying one or more particular sources, distinct from said server device, as having one or more privacy requirements for obtaining a crowdsourcing observation by a mobile device;
transmitting, at said mobile device, a first message identifying at least one source of said one or more particular sources as a candidate for obtaining said crowdsourcing observation; and
receiving a second message indicating a level of said crowdsourcing observation permitted for said at least one source.

26. The method of claim 25, wherein said first message identifies said at least one source using at least one of the following: an identity for an access point; an identity for a femtocell; a geographic location for said mobile device; a location history for said mobile device; a geographic area; a type of an access point; an identity of a network operator; an identity of a venue; a type of a femtocell; or any combination thereof.

27. The method of claim 25, and further comprising:
receiving a third message prior to transmitting said first message, said third message designating said at least one source as a tentative source for obtaining said crowdsourcing observation.

28. The method of claim 25, and further comprising:
receiving a fourth message comprising a request for additional information related to said at least one source; and
transmitting a fifth message comprising said additional information, said fourth message being received after transmitting said first message and before receiving said second message.

29. The method of claim 28, wherein said additional information comprises at least one of the following: an identity for an access point; an identity for a femtocell; a geographic location for said mobile device; a location history for said mobile device; a geographic area; a type of an access point; a type of a femtocell; an identity of a network operator; an identity of a venue; or any combination thereof.

30. The method of claim 25, wherein said at least one source comprises at least one of the following: an IEEE 802.11 Wi-Fi access point; a Bluetooth® access point; a Bluetooth Low Energy (BTLE) access point, an LTE femtocell; a geographic area; or any combination thereof.

31. The method of claim 25, wherein said at least one source is identified via at least one of the following: a Media Access Control (MAC) address; a cell global identifier; a location; or any combination thereof.

32. The method of claim 25, wherein said mobile device comprises a Secure User Plane Location (SUPL) Enabled Terminal (SET).

33. The method of claim 25, wherein said first and said second messages are transmitted using at least one of the following: a SUPL session; an LTE Positioning Protocol (LPP); an LPP Extensions (LPPe) protocol; or any combination thereof.

34. An apparatus comprising:
means for receiving a crowdsourcing request from a server device identifying one or more particular sources, distinct from said server device, as having one or more privacy requirements for obtaining a crowdsourcing observation;
means for transmitting a first message identifying at least one source of said one or more particular sources as a candidate for obtaining said crowdsourcing observation; and
means for receiving a second message indicating a level of said crowdsourcing observation permitted for said at least one source.

35. The apparatus of claim 34, wherein said first message identifies said at least one source using at least one of the following: an identity for an access point; an identity for a femtocell; a geographic location for said mobile device; a location history for said mobile device; a geographic area; a type of an access point; a type of a femtocell; or any combination thereof.

36. The apparatus of claim 34, and further comprising:
means for receiving a third message prior to receiving said first message, wherein said third message designates said at least one source as a tentative source for obtaining said crowdsourcing observation.

37. The apparatus of claim 36, and further comprising:
means for receiving a fourth message that comprises a request for additional information related to said at least one source; and
means for transmitting a fifth message that comprises said additional information, wherein said fourth message is received after transmitting said first message and before receiving said second message.

38. The apparatus of claim 37, wherein said additional information comprises at least one of the following: an identity for an access point; an identity for a femtocell; a geographic location for said mobile device; a location history for said mobile device; a geographic area; a type of an access point; a type of a femtocell; or any combination thereof.

39. A mobile device comprising:
a wireless transceiver to communicate with an electronic communications network; and
one or more processors coupled to a memory and configured to:
obtain a crowdsourcing request received at said wireless transceiver from a server device identifying one or more particular sources, distinct from said server device, as having one or more privacy requirements for obtaining a crowdsourcing observation;
initiate transmission of a first message via said wireless transceiver identifying at least one source of said one or more particular sources as a candidate for obtaining said crowdsourcing observation; and
obtain a second message received at said wireless transceiver indicating a level of said crowdsourcing observation permitted for said at least one source.

40. The mobile device of claim 39, wherein said first message identifies said at least one source using at least one of the following: an identity for an access point; an identity for a femtocell; a geographic location for said mobile device; a location history for said mobile device; a geographic area; a type of an access point; a type of a femtocell; or any combination thereof.

41. The mobile device of claim 39, wherein said one or more processors are further configured to:
obtain a third message received at said wireless transceiver prior to receiving said first message, wherein said third message designates said at least one source as a tentative source for obtaining said crowdsourcing observation.

42. The mobile device of claim 41, wherein said one or more processors are further configured to:
obtain a fourth message received at said wireless transceiver that comprises a request for additional information related to said at least one source; and
initiate transmission of a fifth message via said wireless transceiver that comprises said additional information, wherein said fourth message is received after transmitting said first message and before receiving said second message.

43. The mobile device of claim 42, wherein said additional information comprises at least one of the following: an identity for an access point; an identity for a femtocell; a geographic location for said mobile device; a location history for said mobile device; a geographic area; a type of an access point; a type of a femtocell; or any combination thereof.

44. An article comprising:
a non-transitory storage medium having instructions executable by a processor to:
obtain a crowdsourcing request received from a server device identifying one or more particular sources, distinct from said server device, as having one or more privacy requirements for obtaining a crowdsourcing observation by a mobile device;
initiate transmission of, at said mobile device, a first message identifying at least one source as a candidate for obtaining said crowdsourcing observation; and
obtain a second message indicating a level of said crowdsourcing observation permitted for said at least one source.

45. The article of claim 44, wherein said first message identifies said at least one source using at least one of the following: an identity for an access point; an identity for a femtocell; a geographic location for said mobile device; a location history for said mobile device; a geographic area; a type of an access point; an identity of a network operator; an identity of a venue; a type of a femtocell; or any combination thereof.

* * * * *